(12) United States Patent
Cuttner et al.

(10) Patent No.: US 8,683,518 B2
(45) Date of Patent: Mar. 25, 2014

(54) INTEGRATED MEDIA VIEWING ENVIRONMENT

(75) Inventors: Craig D. Cuttner, Norwalk, CT (US); Sarah Cotsen, New York, NY (US); Henry Merritt Paulson, III, New York, NY (US); Mary Baumgartner, New York, NY (US); Sandy Alessandro Spadavecchia, New York, NY (US); John Barnett Ovrutsky, Yorktown Heights, NY (US); Stephanie Otto, Sherman Oaks, CA (US); Michael Stanley Onaitis, Sherman Oaks, CA (US)

(73) Assignee: Home Box Office, Inc., New York, NY (US)

( * ) Notice: Subject to any disclaimer, the term of this patent is extended or adjusted under 35 U.S.C. 154(b) by 1776 days.

(21) Appl. No.: 10/753,860

(22) Filed: Jan. 7, 2004

(65) Prior Publication Data

US 2004/0221308 A1 Nov. 4, 2004

Related U.S. Application Data

(60) Provisional application No. 60/438,599, filed on Jan. 7, 2003.

(51) Int. Cl.
*G06F 3/00* (2006.01)
(52) U.S. Cl.
USPC .............................................. 725/39; 725/46
(58) Field of Classification Search
USPC ................................................ 725/39, 46, 47
See application file for complete search history.

(56) References Cited

U.S. PATENT DOCUMENTS

| | | | |
|---|---|---|---|
| 5,003,384 A | 3/1991 | Durden et al. | |
| 5,353,121 A | 10/1994 | Young et al. | |
| 5,621,456 A | 4/1997 | Florin et al. | |
| 5,684,525 A | 11/1997 | Klosterman | |
| 5,945,987 A * | 8/1999 | Dunn | 715/718 |
| 6,005,565 A * | 12/1999 | Legall et al. | 715/721 |
| 6,029,195 A | 2/2000 | Herz | |
| 6,144,376 A | 11/2000 | Connelly | |
| 6,199,077 B1 | 3/2001 | Inala et al. | |
| 6,515,680 B1 * | 2/2003 | Hendricks et al. | 715/716 |
| 6,591,245 B1 | 7/2003 | Klug | |
| 2001/0037348 A1 | 11/2001 | Nakada et al. | |

(Continued)

FOREIGN PATENT DOCUMENTS

| | | |
|---|---|---|
| EP | 1 099 347 | 4/2006 |
| WO | WO 00/52928 | 9/2000 |

OTHER PUBLICATIONS

International Search Report for PCT/US04/00352.
European Search Report for EP 04023142.

*Primary Examiner* — Nasser Goodarzi
*Assistant Examiner* — Hyun Hong
(74) *Attorney, Agent, or Firm* — Kenyon and Kenyon LLP

(57) ABSTRACT

An integrated media viewing environment including a user interface (UI) and a method for providing a program guide with an integrated media viewing environment. The integrated media viewing environment presents viewers with on-screen displays, e.g., a single, integrated on-screen display, that may be used to obtain, view and/or record media content, including programming that is currently airing, available via download or data streaming, available on an "on demand" basis, and/or available from local storage or removable media.

30 Claims, 17 Drawing Sheets

UI ELEMENTS: HOME (ROOT) SCREEN

(56) References Cited

U.S. PATENT DOCUMENTS

| | | |
|---|---|---|
| 2002/0057297 A1 | 5/2002 | Grimes et al. |
| 2002/0059163 A1 | 5/2002 | Smith et al. |
| 2002/0069404 A1 | 6/2002 | Copeman et al. |
| 2002/0078440 A1* | 6/2002 | Feinberg et al. ............ 725/9 |
| 2002/0144264 A1* | 10/2002 | Broadus .................... 725/39 |
| 2002/0184195 A1 | 12/2002 | Qian |
| 2003/0005429 A1* | 1/2003 | Colsey ...................... 725/8 |
| 2003/0005445 A1* | 1/2003 | Schein et al. .............. 725/51 |
| 2003/0084450 A1* | 5/2003 | Thurston et al. ........... 725/46 |
| 2003/0088872 A1* | 5/2003 | Maissel et al. ............. 725/46 |
| 2003/0093794 A1 | 5/2003 | Thomas et al. |
| 2003/0146940 A1* | 8/2003 | Ellis et al. ................ 345/811 |
| 2003/0177495 A1* | 9/2003 | Needham et al. .......... 725/55 |
| 2003/0208763 A1* | 11/2003 | McElhatten et al. ....... 725/58 |
| 2004/0060063 A1* | 3/2004 | Russ et al. ................. 725/46 |
| 2005/0071323 A1 | 3/2005 | Gabriel et al. |

* cited by examiner

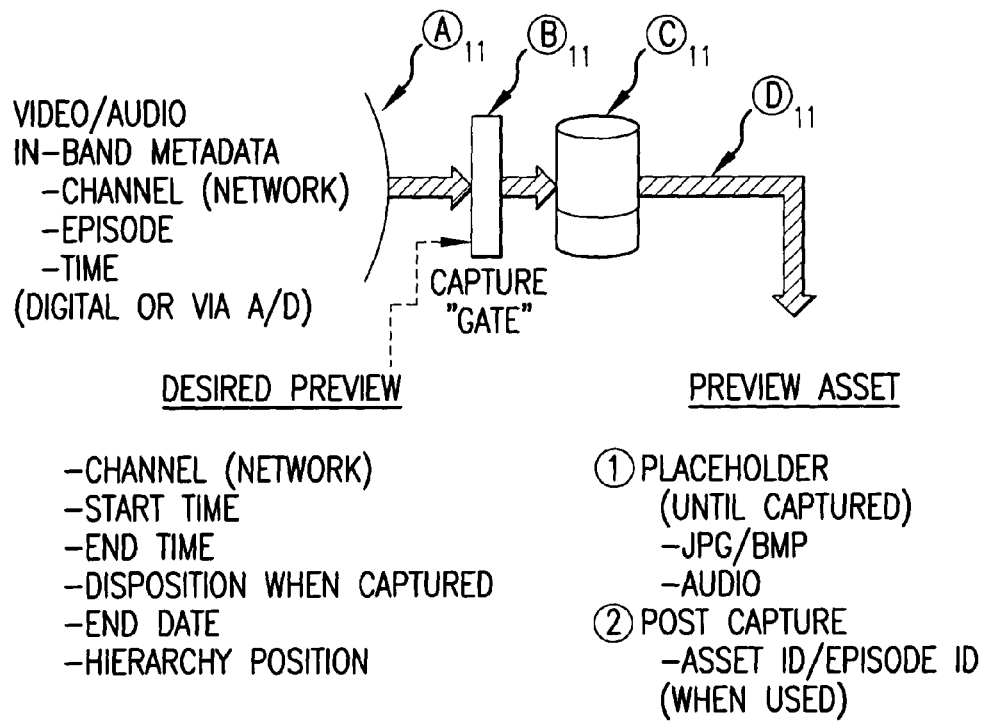
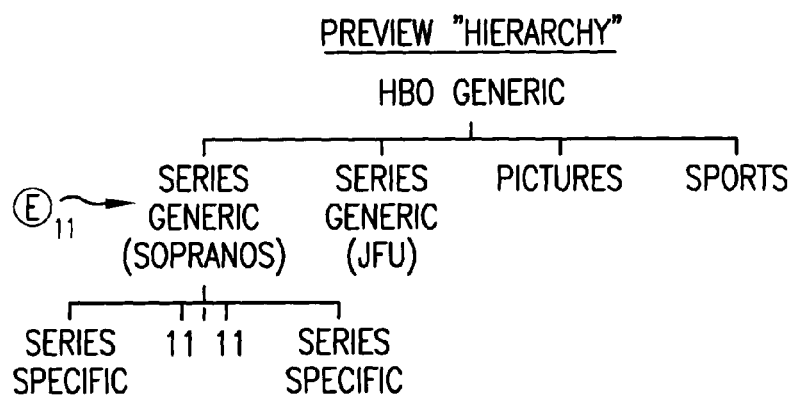
FIG. 11

FIG. 13

HBO CENTRAL

HOME
HBO GUIDE
HBO SELECTS
MY HBO

TOP PICKS
ALL MOVIES  SERIES  DOCUMENTARY  SPORTS  COMEDY  LATE NIGHT

⊙ MOULIN ROUGE 130
COMEDY SELECTS
BAD GIRL SELECTS
⊙ SIX FEET UNDER
THE SOPRANOS
DENNIS MILLER LIVE
LORD OF THE RINGS
MINORITY REPORT

181

RELATED  PREVIEW  VIEW NOW

HBO EXCLUSIVES

SIX FEET UNDER
GET THE ENTIRE 1st SEASON

NOW PLAYING
THE SOPRANOS
CURB YOUR ENTHUSIASM
⊙ ANGEL EYES
HARRY POTTER
THE WIRE

INTEGRATED MEDIA VIEWING ENVIRONMENT

RELATED APPLICATION

This application claims the benefit under 35 U.S.C. §119 (e) of U.S. provisional application Ser. No. 60/438,599, filed Jan. 7, 2003, which is expressly incorporated herein by reference in its entirety.

FIELD OF THE INVENTION

The present invention relates to video, digital video recording, television, and media technology.

BACKGROUND INFORMATION

As television and media technology advances, viewers have various viewing and recording options. Additionally, viewers have many options available to them for recording media content, e.g., television programming, for future viewing. Current systems provide numerous on-screen recording and information displays that the viewer must navigate through in order to obtain, view and/or record media content.

It is an object of the present invention to provide an integrated media viewing environment that presents viewers with on-screen displays, e.g., a single, integrated on-screen display, that may be used to obtain, view and/or record media content.

SUMMARY

An integrated media viewing environment according to an example embodiment of the present invention may provide a convenient manner for users to learn about upcoming television shows and/or movies (programming) and to obtain suggestions about what media programming to record and/or watch.

In one example embodiment of the present invention, a single, integrated program guide is displayed to a user, the program guide including two lists of program titles, the first list including titles of recommended programs, and the second list including titles of programs that are immediately available for viewing. The first list and the second list may include titles of programs that are stored locally (relative to the user), programs that are currently airing on television, programs that are scheduled to air on television in the future, and/or programs that are available to the user via download, streaming, etc.

In another example embodiment of the present invention, a program guide is displayed to a user, the program guide including a list of program titles associated with programming that is immediately available for viewing. The programming may include programs that are stored locally (relative to the user), for example, on a personal video recorder or a hard drive, programming that is currently being aired, and/or programming that is otherwise immediately available to the user for viewing, e.g., via download "on-demand", streaming data, etc. The list may be filtered to display only the titles associated with programs that meet predetermined criteria (e.g., programs associated with a particular channel, programs featuring particular actors, programs of a particular director, programs of a particular genre, etc.).

In another example embodiment of the present invention, a program guide (e.g., list of program titles) is displayed to a user that includes availability icons. These icons provide visual cues to a user as to whether programs are stored locally (relative to the user), are currently airing on television, or will be airing in the future (or are available for download or streaming). The icons may also indicate if the program is suggested or recommended.

In another example embodiment of the present invention, an integrated viewing environment may be provided that allows a user to watch any channel related to the programming provider, access information about the show they are currently watching, record the airing of a show, record a future airing of the show, find other programs available for viewing, and find programs somehow related to the one currently airing, for current and/or future airing. All of this functionality may be offered to the user without interrupting the viewing (e.g., via an overlay across the bottom of the screen).

In another example embodiment of the present invention, a user may select and view previews of programs that are stored locally (relative to the user), are currently airing on television, or will be airing in the future (or are available for download or streaming). The previews may be captured, for example, "on the fly," or may be provided as a preview clip together with or separately from content or programs.

BRIEF DESCRIPTION OF THE DRAWINGS

FIG. 11 illustrates "preview capture" according to an example embodiment of the present invention.

FIG. 13 illustrates an alternative embodiment of the integrated media viewing environment illustrated in FIG. 3.

DETAILED DESCRIPTION

Example Integrated Media Viewing Environment

Figure 1:
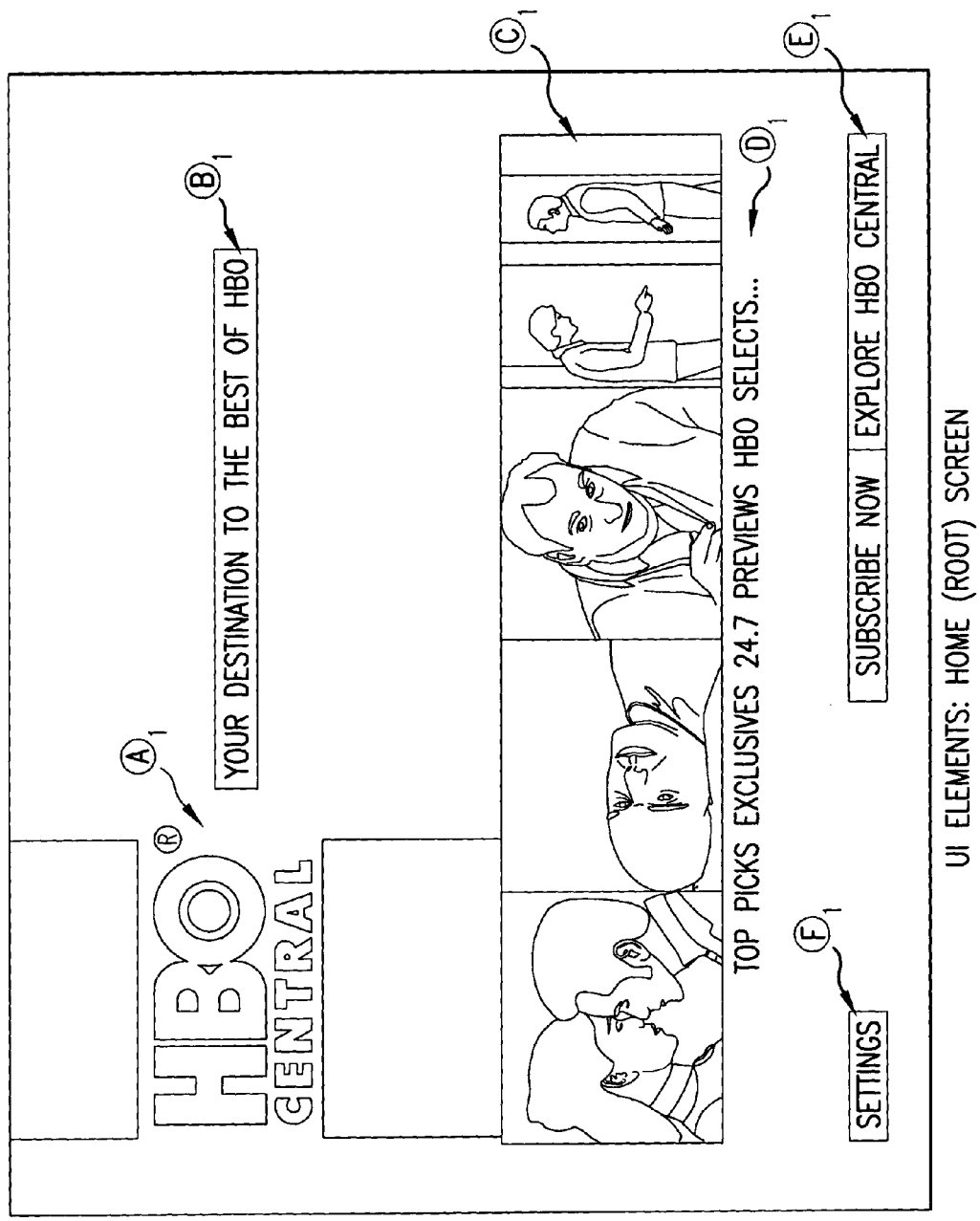
FIG. 1 illustrates a first view of the integrated media viewing environment according to an example embodiment of the present invention.

An integrated media viewing environment according to an example embodiment of the present invention may provide a convenient manner for a user to learn about upcoming television shows and/or movies (programs or programming) and to obtain suggestions about what media programming to record and/or watch. The integrated media viewing environment may display, for example, a "Top Picks" area that showcases recommended titles (e.g., television programming) based on, for example, a programming provider's promotional priorities, a viewer's expressed preferences, and/or a viewer's viewing history. The featured (displayed) titles may include a combination of shows already recorded (identified by, for example, a "now available" icon or a "stored program" icon), shows to be aired in the future (identified by, for example, a "future program" icon), shows that are currently airing (identified by, for example, a "now showing" icon), and shows available for download or streaming (identified by, for example, a "download" icon or a "streaming" icon). For each featured title, the users may watch a preview (e.g., a promotional clip including video, text, images and/or other media), view detailed information about the program, find related programs via a smart recommendation engine, schedule the program for recording or watch it immediately if the title is available for viewing. The "Top Picks" area may be constantly updated to provide the user of the integrated media viewing environment with current viewing information.

A "Now Playing" guide may be also included in the integrated media viewing environment.

For example, the "Now Playing" guide may provide a user with the immediate viewing options by aggregating in one place a listing of recorded programming, programming currently airing or playing on television, and/or programming that is available via download, data streaming or "on demand". Also, by manner of filters that sort or select by criteria such as channels, themes and genres, a user may display a listing of only those programs and/or channels that appeal to that user. The system according to the present invention provides for a hierarchy of filters that are used to determine a list of programming that appeals to the particular user. Filters, when applied to a list of programming (content) and a user's desired program/content attributes, display or suppress items of content (program titles) or present it in a sorted order in a list based on the similarity of an indication of the consumer's desired content (via, for example, XML fields) and metadata (possibly in XML fields) related to the content to be categorized for potential presentation to the consumer (or recorded or acquired). Individual filters, for example, may omit content (a program title) based on exclusion of adult content for a child, or may prioritize romantic comedies with a favorite actor versus drama content with the same actor. Thus, filters may be nested in a hierarchy to yield a list of desired and prioritized relevant content (programming).

Additionally, icons may be used in the integrated media viewing environment to help a user understand his or her viewing options by visually identifying whether the program is available for download or streaming, is available "on-demand", has been recorded, and/or is airing live. In addition, if the program is airing live, the icons will indicate if the show is about to start or how far along into the broadcast it is.

The integrated media viewing environment may also provide users with the opportunity to choose to have programming that is not presently airing ("stunt" programming) to be delivered to the user's local hard drive (e.g., personal video recorder ("PVR") via S-VOD, VOD, download or streaming. "Stunt" programming (programming that is not presently airing) may constantly change and may be offered on a regular basis. An example of stunt programming would be the first season of a television series that is offered in anticipation of the second season of the same television series. A service provider may offer "stunt" programming on the basis of its promotional priorities, on the basis of the user's preferences expressly provided by the user (e.g., as defined via user settings) and/or analysis of the user's viewing history.

The integrated media viewing environment according to the present invention may provide a "free trial" of select programming (e.g., the three top shows of a programming provider) to non-subscribing users with the option to subscribe to the services of the programming provider on-screen. The free trial may be on-demand and live in the hard-drive of the user's, for example, PVR or may be delivered to the hard drive of the user on request.

The integrated media viewing environment according to the present invention may expand "season pass" functionality to give both the programming provider and users more flexibility to create and/or select a broad range of "packages" of programming by a wide variety of selection criteria (e.g., actors, genres, award-winners, directors, themes). The selected programming may be based on, for example, a programming provider's promotional priorities, a viewer's expressed preferences, and/or a viewer's viewing history. The "season pass" functionality programs the local PVR to record selected programming. For example, a user may use the "season pass" functionality to record every episode of a particular TV series that is currently airing or is scheduled to air in the future. According to the system of the present invention, "season pass" functionality may be implemented by the consistent application of filters such that essentially every episode of a series would be recorded by inference (i.e., the user is not required to expressly configure the system of the present invention to record every episode). The system may record, for example, based on an analysis of the user's viewing habits. Other systems (e.g., TiVo®) may implement an explicit season pass approach where a method is configured to explicitly record every episode.

The integrated media viewing environment according to the present invention may allow users to watch any channel related to the programming provider, access information about the show they are currently watching, record that airing of the show, record a future airing of the show, find other programs available for viewing, and find programs somehow related to the one currently airing for download or streaming, recording, current viewing and/or future viewing. All of this functionality may be offered to users without interrupting their viewing (i.e., as an overlay across the bottom of the screen).

Navigation areas of the integrated media viewing environment according to the present invention may include a "Home Area" (e.g., a main screen), a "Guide Area" that is a searchable and customizable guide for all the programming of the programming provider, a "Selects Area" that enables the extended Season Pass capabilities, a "My Area" that may allow users to customize the integrated media viewing environment by identifying programming/channel preferences, and a "Related Area" that may allow users to identify programming related by theme, actor or director to the selected show.

Home Page

FIG. 1 illustrates a first view of the integrated media viewing environment according to an example embodiment of the present invention. The first view may be the "home page" of the integrated media viewing environment. The integrated media viewing environment may be displayed on a television (TV) (via, for example, a set-top box), a personal computer, or on any device that has the ability to play media content by manner of user selection.

The User Interface (UI) illustrated in FIG. 1 may include a first area A1 for optionally branding the UI by the logo of either a service provider (e.g., a fee-based provider of a PVR, content management, etc.) or a content provider (e.g., HBO®). The UI may also include a second area B1 reserved for marketing slogans, advertising or other information.

Also, a highlight area C1 may be provided for moving and/or still graphic images that may represent, for example, other pages or areas within the integrated environment. Textual descriptions D1 of the items in the highlight area C1 may be provided below the images. In the example embodiment, the user may navigate over and select (via, e.g., a remote control device, keyboard, mouse, etc.) a textual description so that the user may be directed to an associated page or area within the environment. As shown in FIG. 1, for example, the textual descriptions D1 include "Top Picks," "Exclusives," "24.7 Previews" and "HBO Selects" images. In the example embodiment, each of these areas may be navigated over and selected by a user. The user is then directed to a new page or area, depending on which description is selected. For example, if "Top Picks" is selected, the user is directed to the "Top Picks" page or area. Horizontal scrolling may also be supported within the highlight area C1 and the textual descriptions D1.

Optional selections E1 may be displayed by the integrated media viewing environment content when a user is not currently a subscriber to the UI service (and/or content of the programming provider) or when the users desires to "explore" content (e.g., preview content) without being prompted for subscription.

Also, a User Settings area F1 may be included in the home page of FIG. 1. A user may utilize the User Settings area to define various parameters (criteria, preference values, etc.) that indicate the user's viewing preferences. The User Settings area may provide the ability to define a user profile detailing the user's demographic information such as age, gender, and residence. Other parameters that the user may define in User Settings area include genre preferences (e.g., comedy, mystery, action, romance, music, documentary, sports, etc.), actor preferences, and director preferences. Additionally, the User Settings area may be used to define a "Cost to Obtain" parameter and a "Time to Wait" parameter. The user defines the "Cost to Obtain" parameter in order to specify the amount of money the user is willing to pay to purchase programming. The "Time to Wait" parameter is defined by the user in order to specify the amount of time the user is willing to wait before being able to view an airing of a program (e.g., movie, television show, concert, etc.).

Top Picks Page

Figure 2:
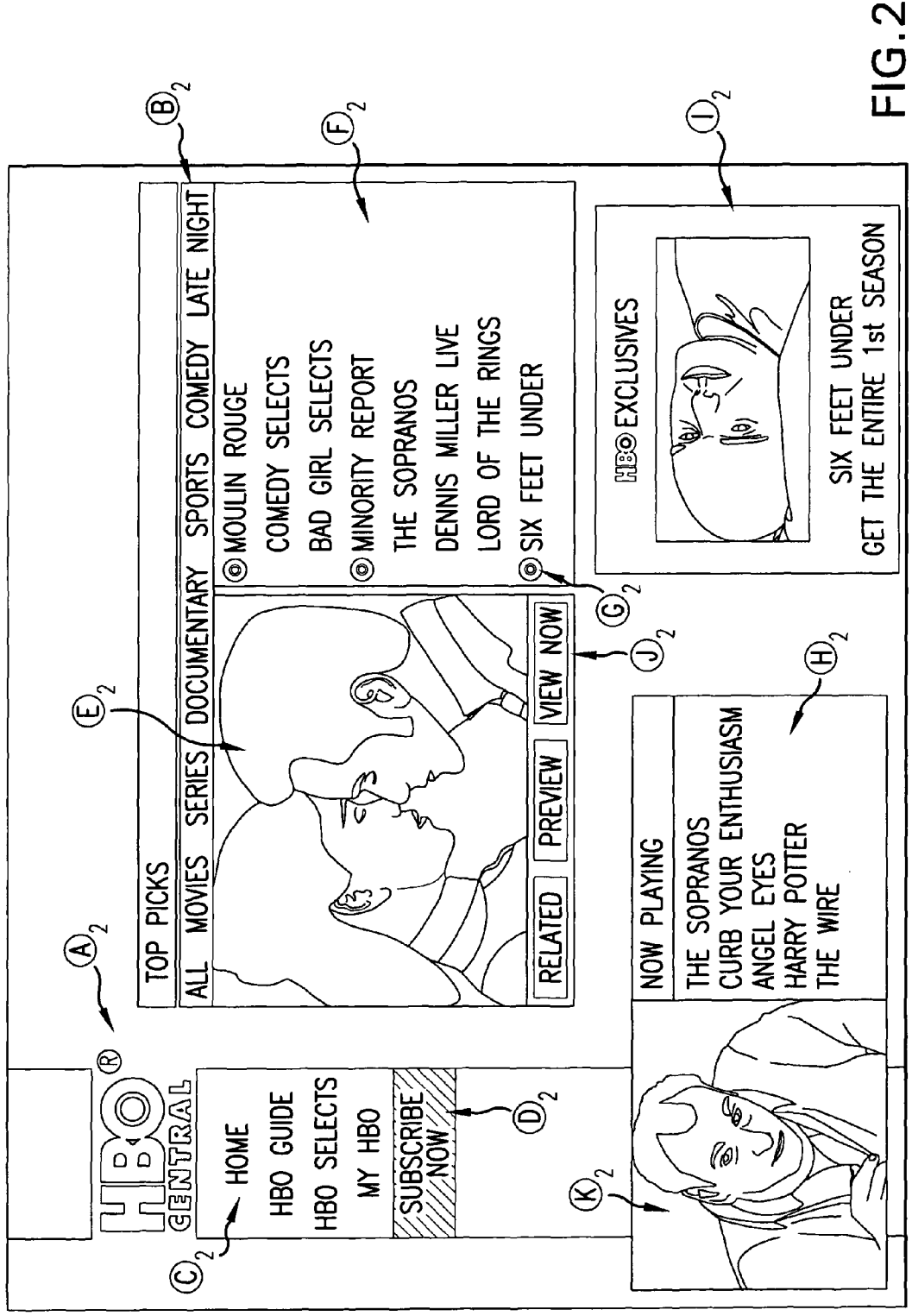
FIG. 2 illustrates an integrated programming guide page according to an example embodiment of the present invention.

FIG. 2 illustrates an integrated programming guide page, e.g., a "Top Picks" page, according to an example embodiment of the present invention. The "Top Picks" page is an ordered list of content based on both the calculative result of the user's desired content (via metadata value) and the program providers metadata values to both describe the content elements and/or "punch through" particularly good content (or content that meets promotional or other priorities of a service provider) by providing a higher value metadata to override a user's filter (see FIG. 10). This enables an otherwise restrictive filter setting to still display excellent content. List area F2 and Now Playing list H2 are interrelated as they are both driven by consumer's desired content (by weighting) and what content is available to the consumer. In the example embodiment of the present invention, list area F2 may be primarily driven by weights of marketing-centric and content descriptive metadata and secondarily by availability. The Now Playing list H2 may be primarily driven by the weight of content's availability, with the marketing-centric and content descriptive metadata in a secondary role as a sorting mechanism.

In this example embodiment, the "Top Picks" page includes a "branding area" A2 to display, for example, information related to the service provided. The "Top Picks" page also includes a navigation menu C2 of "areas" in the UI such as "home" (e.g., which, when selected, brings the user to the Home Page), "Guide" (e.g., which, when selected, displays a list of available content), "Selects" (which, when selected, displays a list of featured content), and "My HBO" (e.g., suggestions/favorites bookmarked). Also displayed in the navigation menu C2 is a selectable button for "Subscribe Now" D2. In this example embodiment, the "Subscribe Now" button D2 appears only if the user has the ability to subscribe to content or needs to pay for content that is above a configurable threshold of cost.

In one area of the "Top Picks" page, a "list area" F2 provides a list of content programming that may be, for example, highly suggested by a service provider (e.g., a filtered list of titles of programs). The list of content programming may be determined based on metadata values that describe the content, or a "punch-through" (override) value (or values) of metadata which would cause content to be displayed on the list, even if the content's metadata value for a particular consumer-selected threshold filter level was not exceeded (described in further detail below). A navigation bar B2 is available which provides filter parameters for the "list area" F2 and/or "Now Playing" list H2. The filter parameters may include "All", "Movies", "Documentary", "Sports", and "Comedy". Selecting a filter parameter in the navigation bar B2 may provide further filtering for the list of titles in the "list area" F2 and/or the "Now Playing" list H2. An icon, e.g., icon G2, may optionally be provided next to some or all of the program titles. In one example embodiment, the icon may provide the user with visual cues as to whether the program associated with the title is available for download or streaming, stored locally (e.g., on the PVR), or currently airing (i.e., "now showing"). The icon may also indicate that the program is highly-rated or suggested, or of specific interest. A user may navigate over a title and select it (using, for example, a remote control device, a keyboard, a mouse, etc.). The titles in list area F2 refer to programming that is suggested by the service provider based on the service provider promotional priorities and/or the user preferences defined by the user in the User Settings area. A title in the list area F2 may refer to programming that is contrary to the preferences defined in the User Settings in cases when the service provider's promotional priorities supercede the user's preferences. Also, the titles in the list area refer to programming that is currently available for viewing and/or programming that will be available in the future (e.g., programming scheduled to air in the future and/or programming available for download/streaming in the future).

FIG. 2 includes a "Viewing" area E2. In the example embodiment, the "Viewing" area E2 displays previews, data, images, video and other media related to a program that the user has selected in list area F2.

The "Top Picks" page also includes a graphics area K2 that displays an image related to a program title that the user has selected or related to another program that the user may be interested in viewing.

The "Top Picks" page also includes a navigation area J2 that may be configured, for example, based on the content capability, availability and/or user ability. In the example embodiment of FIG. 2, the navigation area J2 may display the options of "related," "preview" and "view now." When the "related" option is selected, a user may display information related to a title selected in list area F2. For example, a drop-down menu may appear that lists various options including, e.g., "by actor," "by director" and "by genre." The user would then select one of the options and obtain, for example, titles of programs that are available for viewing (now or in the future) in which the same actors appears are displayed. By selecting "by director," titles of programs that are available for viewing (now or in the future) which are directed by the same director is provided. Finally, by selecting "by genre," titles of programs of the same genre as the selected title is displayed.

The "preview" option appears when a preview is available for the selected program title. When selected, the preview may be, for example, a full motion video clip and/or an audio clip. The preview may be stored on the user's PVR or hard disk, or may be available in real-time from a service provider (e.g., via satellite, cable, broadcast, etc.). As discussed below, the preview may also be captured "on the fly".

The "view now" option does not appear to a user who is not a subscriber to the source of the program title (selected in list area F2) or if the cost threshold exceeds the user-set limit and has not chosen to otherwise subscribe. When the "view now" option is selected, the program associated with the selected title plays.

FIG. 2 also includes a "Now Playing" area H2. In the example embodiment, the "Now Playing" area H2 displays a list of titles of programs that are available for immediate viewing. For example, the list may include titles of programs that are stored locally on the user's PVR or hard drive. The list may also include titles of programs that are currently airing on television and/or that are available on an "on-demand" basis and/or available via download or data streaming. In accordance with the example embodiment of the present invention, the list may be filtered so that only certain program titles appear (e.g., the titles of programs on certain channels, titles of programs that meet the parameters set in the User Settings area, or titles of programs with different themes and genres, or user defined criteria). For example, titles in the "Now Playing" area H2 that are available on an "on-demand" basis may be listed only when the programming meets the user's preferences as indicated in the User Settings area (e.g., "on-demand" programming that meets the user's Time to Wait preference, the user's Cost to Obtain preference, genre preferences, etc.), and/or based on the user's viewing history. In another example embodiment, a service provider may override user preferences (as described in further detail below).

In this example embodiment, if a user selects a title on the list, the program will begin to play. In particular, if the program is stored on the user's PVR, the program will play from the user's PVR; if the program is currently airing on television, the television or tuner will be tuned to the proper station; if the program is currently available on an "on-demand" basis via network storage (e.g., Subscription-Video On Demand (S-VOD) and/or Video On Demand (VOD)) the program will play following a request to the network to obtain the program; if the program is currently available via download the program will play (and/or be download to local storage) following a request to the network; if the program is available for download or data streaming (e.g., via the Internet), the program will be accessed and downloaded or streamed.

The "Top Picks" page may also include another display or navigation area 12 (which may include support for full-motion content) that may include a banner ad or link to specific content (e.g., a program) or feature.

Figure 3:
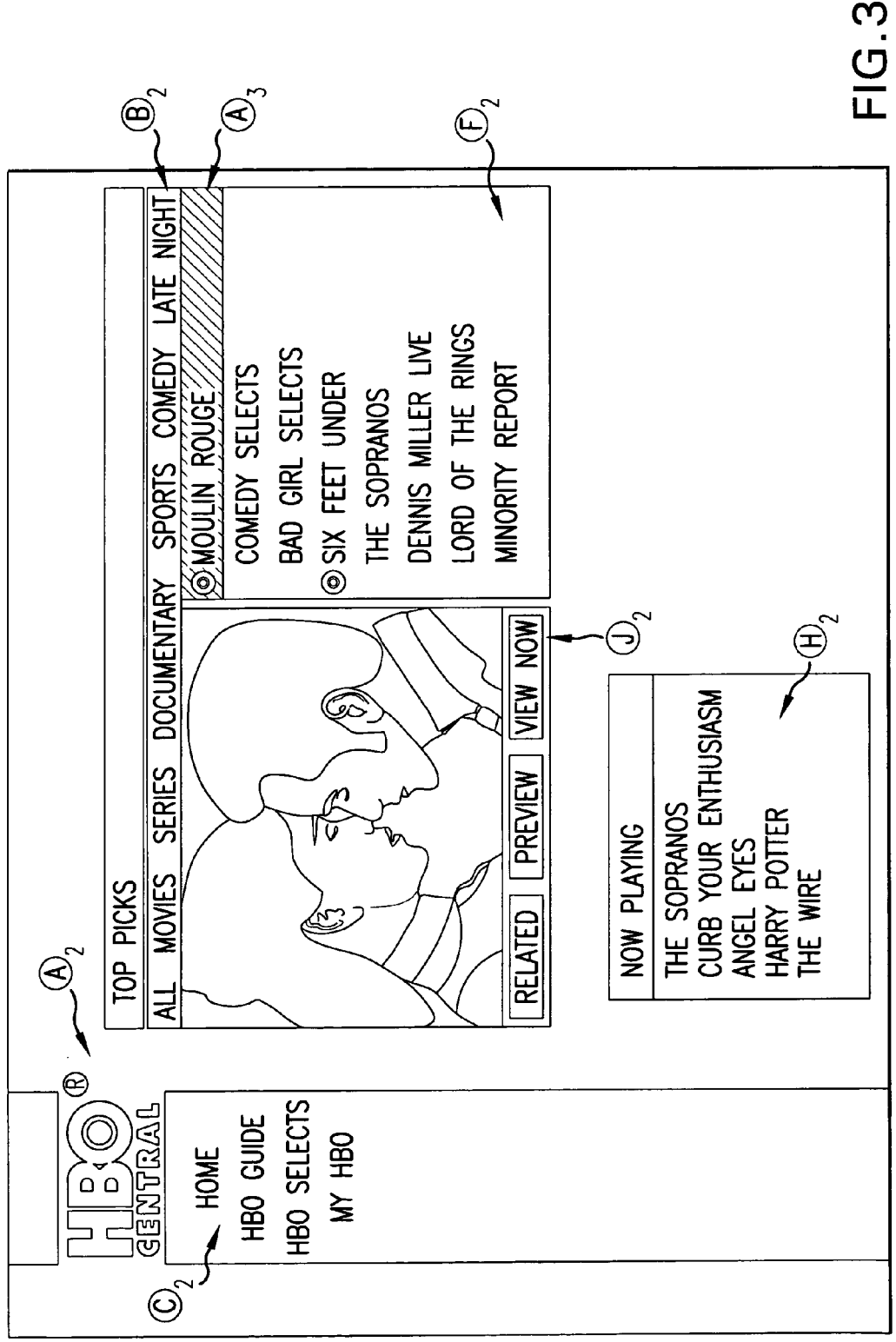
FIG. 3 illustrates highlighting or selecting of a particular title of the list in the integrated programming guide page illustrated in FIG. 2.

FIG. 3 illustrates highlighting A3 of a particular title of the list area F2.

Figure 4:
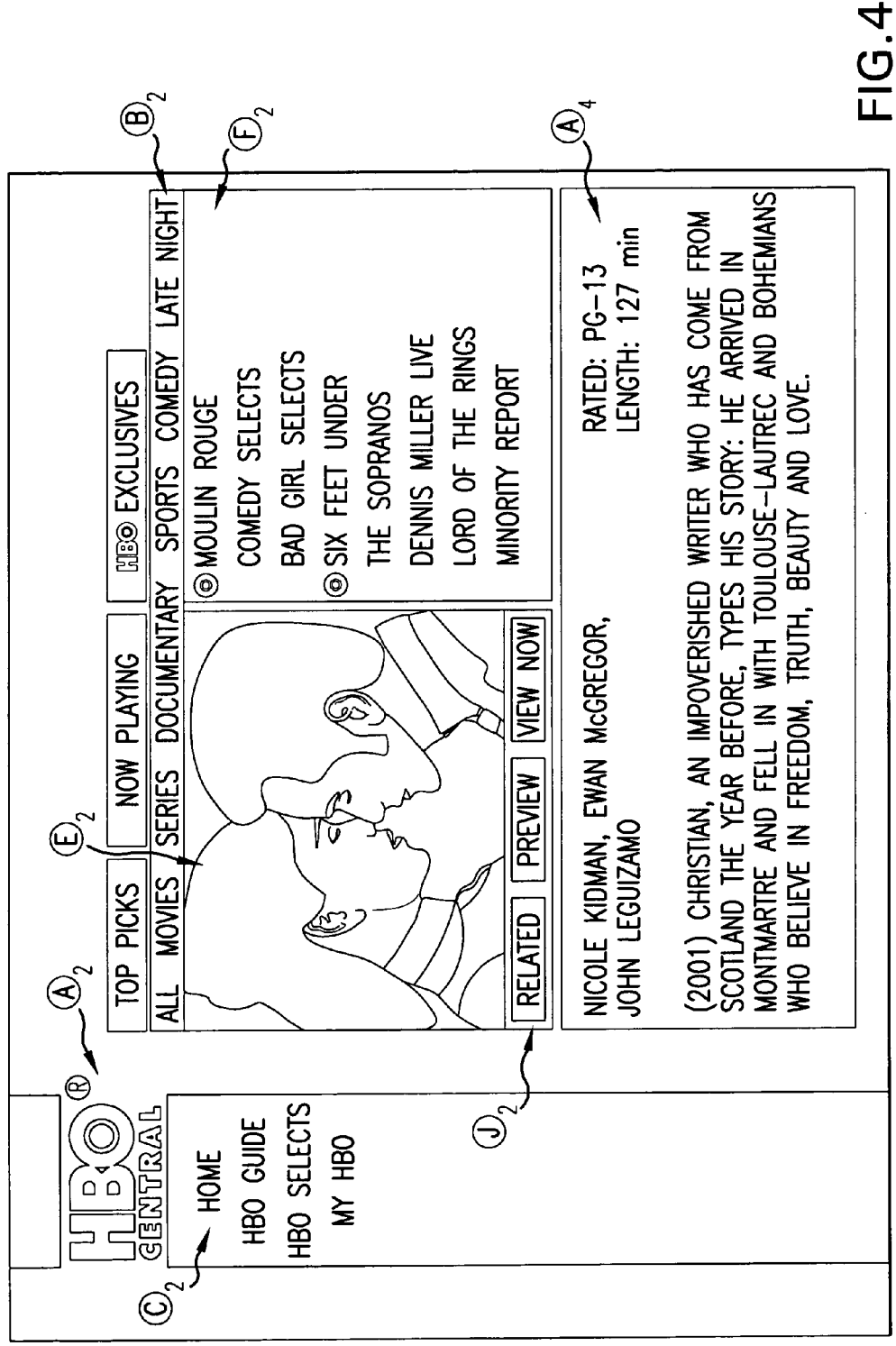
FIG. 4 illustrates the integrated media viewing environment after selecting a particular title.

FIG. 4 illustrates the integrated media viewing environment illustrated in FIG. 3 after the particular title is selected in list area F2. After selecting the title, a display area A4 may appear, e.g., replacing the "Now Playing" H2 and navigation area 12. The display area A4 may display metadata, in textual form, associated with the selected title. In the example embodiment, the metadata may include, for example, a brief description of the program associated with the selected title, ratings information (e.g., PG-13), length of the program, identification of actors, directors, genre, etc.

Figure 5:
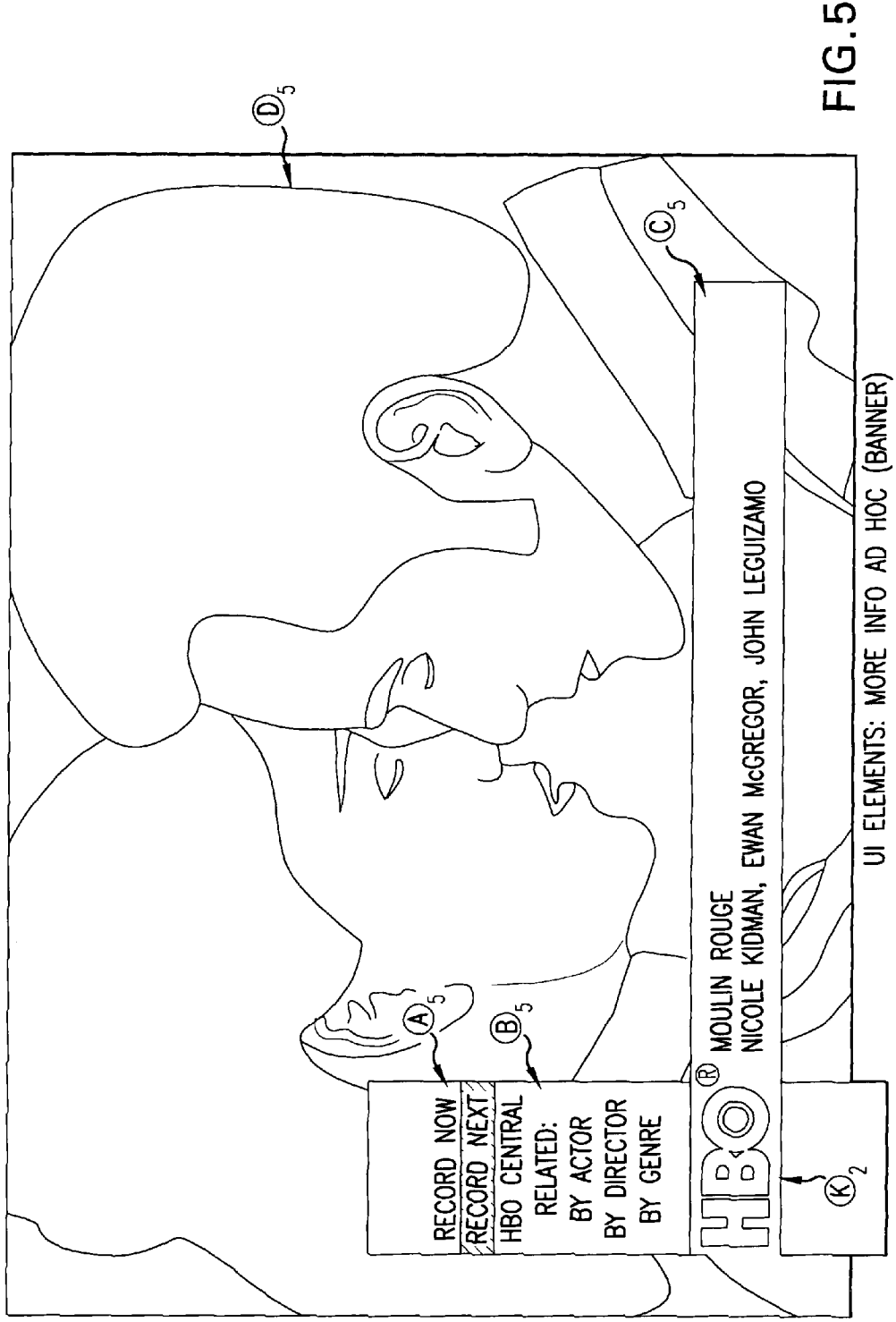
FIG. 5 illustrates a view of the integrated media viewing environment according to the present invention that is displayed to a user while the user is viewing media content.

FIG. 5 illustrates a view of the integrated media viewing environment according to the present invention that may be displayed to a user while the user is viewing media content (e.g., a program). The view may be a UI mode that provides additional elements for use while the user is viewing content (for example, either preview, "full-screen" viewing within the integrated media viewing environment or as an overlay of the users TV screen,) accessed by pressing a remote control button (such as "info"). The UI mode illustrated in FIG. 5 may include a navigation element A5 that allows the user to either record the current program (if, for example, the consumer is watching a traditional cable or broadcast program that was selected by a traditional means such as using an electronic program guide (EPG) or via "channel surfing") or to record the current program during a future showing. In the example embodiment, the "Record Now" option of the navigation element A5 would actuate a PVR function (for example, within a set-top box, home media server, or a Network-based PVR system) to begin recording from this point. "Record Next" would cause, for example, a Table Of Contents Manager (described in further detail below in reference to FIG. 9) to search all content available (channels, S-VOD, VOD, download) to obtain (e.g., by scheduling a download or scheduling recording of an airing) the next full showing of the desired content.

Also in FIG. 5, a navigation bar B5 may provide metadata related to the content currently on the screen. This may be implemented in a manner similar to the "related" option described above in connection with the "Top Picks" page of FIG. 2. For example, selecting "related, by actor" in the navigation bar B5 may cause metadata display area C5 to list other program or content (available or otherwise) featuring the same actor now appearing (in the content as a whole or in this particular scene).

FIG. 5 also illustrates a viewing area D5. A program, image, data, video or other media data may be displayed in the viewing area D5. The media data in viewing area D5 is related to the title that the user has selected from list F2.

Figure 6:
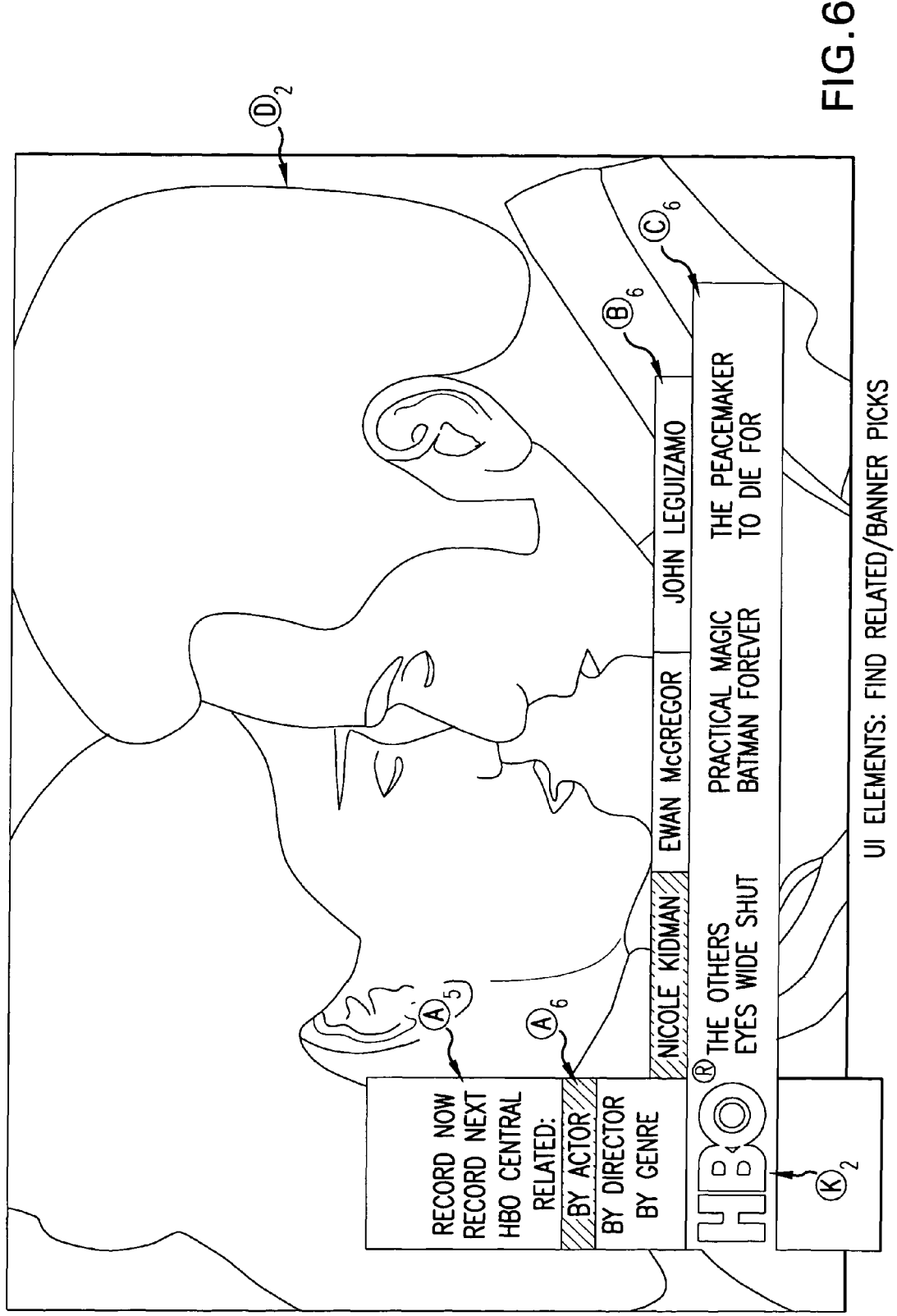
FIG. 6 illustrates another view of the integrated media viewing environment according to the present invention, that is displayed to a user for input user preferences for finding other content or programs.

FIG. 6 illustrates another view of the integrated media viewing environment according to the present invention, that is displayed to a user for the input of user preferences for, for example, related content. This view may be a UI mode for finding other content or programs (available or otherwise) for which the viewer may desire information. For example, this view may be available after selecting or navigating over "related, by actor" in navigation bar B5 of FIG. 5. The selected option is illustrated by A6.

As shown, in the view illustrated in FIG. 6, multiple actors may be displayed in a navigation element B6. A particular actor may then be selected, and titles of content or programs in which the selected actor also appears may be displayed in list box C6.

Selections in the navigation bar A6 may be augmented by, for example, a preference engine and may include selections "by actor" (tagged by metadata described herein); "by genre" (also from metadata) "by suggestion" (a broader metadata match including editorial suggestions and more direct weighting by the preference engine or user preferences than actor, genre, etc.).

Example System for Integrated Media Viewing Environment

Figure 7:
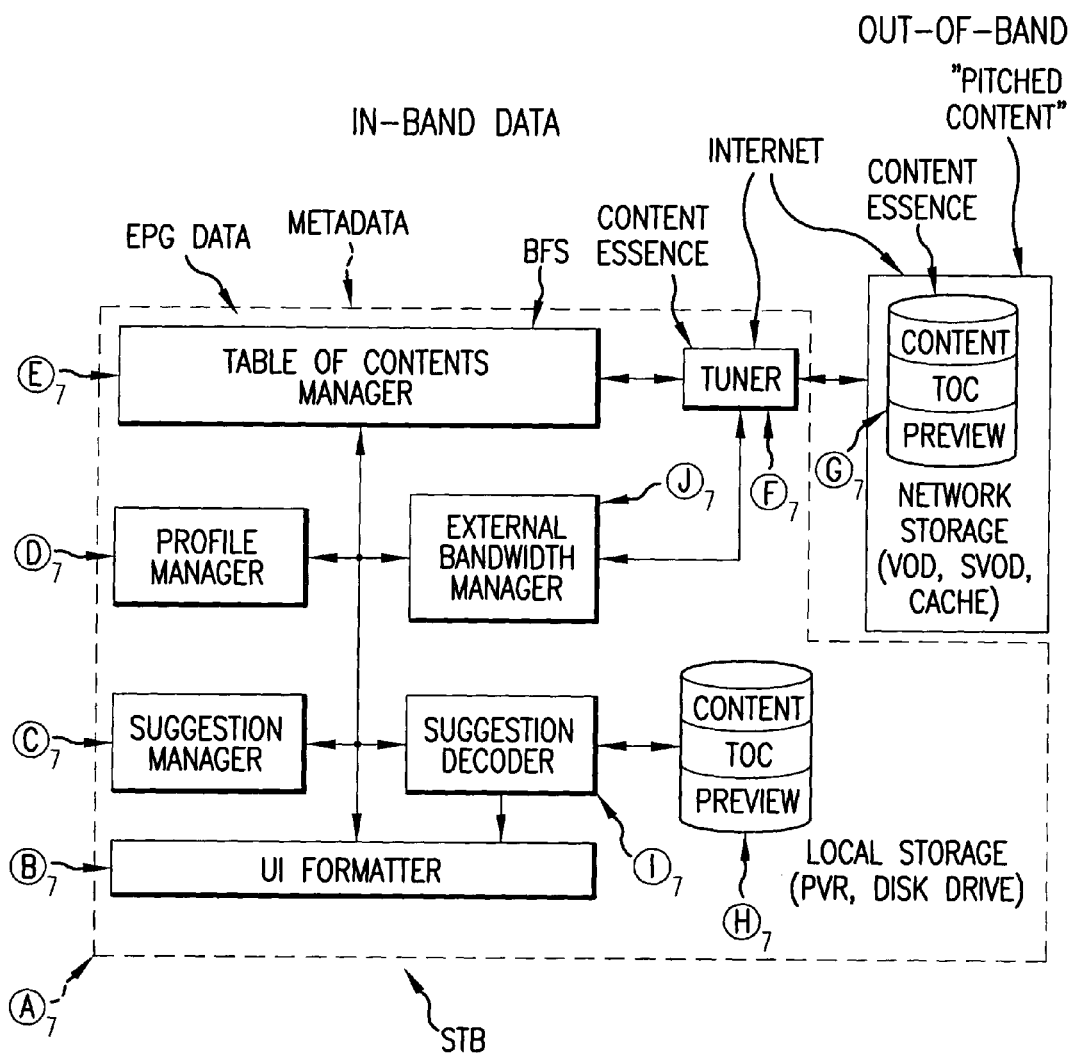
FIG. 7 illustrates an example embodiment of a system for integrated media viewing according to the present invention.

FIG. 7 illustrates an example embodiment of a system for integrated media viewing according to the present invention. The system illustrated in FIG. 7 combines various elements and processes. This example embodiment of the system according to the present invention includes software process modules implemented on a cable-set-top-box (STB) A7 with an integrated PVR (personal video recorder or hard-drive) such as the Scientific Atlanta Explorer 8000. Other STB designs may support the present invention including DirecTV "TiVo" or Echostar "DishPlayer" as well as PC-based configurations.

The UI elements depicted in FIGS. 1-6 may be created in a UI formatter B7. The UI formatter may be a software suite such as Macromedia Flash, Microsoft Windows or other Graphical User Interface (GUI) software.

The example system may include a software module called "Suggestion Manager" C7 (further described in connection with FIG. 10). The Suggestion Manager C7 has inputs and outputs of metadata (i.e., pre- and post-filtering and sort/ordering) as well as inputs from a Profile Manager D7 indicating the consumer's preferences and desired program attributes.

In the example embodiment, the "Profile Manager" D7 may manage the profile of a user or user preferences in a number of ways. For example, the Profile Manager D7 may allow the user to provide express user settings, as described above in connection with FIG. 1. The user may, for example, be provided with menus in order to set genre preferences, actor preferences and director preferences. The user may also be prompted to provide demographic information (age, gender, residence, etc). Also, the user may be prompted to set a "Cost of Obtain" parameter and a "Time to Wait" parameter.

In this example embodiment, the Profile Manager D7 may also "observe" and record other activities within the STB such as viewing programming on linear channels, and may store information regarding such information. These observations may then be used, for example, for formulating filtering parameters. For example, when determining which of the available titles to display on the "Top Picks" page, the titles may be at least partially filtered based on the observations. For example, if a user always watches particular news programs and never watches sit-coms, titles of sit-coms may be omitted, but "suggested" news programs including news programs other than what the user normally watches, may be included.

The system may also include a software module called "Table of Contents Manager" (TOCM) E7 that performs the task of processing and ordering all of the content that is currently available to the user (or could be available via external request, download, purchase, etc.). The TOCM E7 receives inputs from a plurality of sources such as EPG data (conventional cable- or satellite-provider metadata depicting what is on-air and on what channel that content appears), in-band metadata (provided within the analog or digital content stream from the content provider), and Broadcast File System (BFS) data providing metadata about content available via S-VOD or other VOD sources. The TOCM E7 may also be provided (by, for example, a service and/or content provider) with metadata associated with content (programs) that is available to the user via download or data streaming. The TOCM E7 may also be able to search the Internet for content that is available to the user via download and/or data streaming, and may be capable of making content requests over the Internet or other network for content to be recorded on the PVR disk. As described below, in one embodiment, the Profile Manager D7 and the Suggestion Manager C7 may comprise a preference engine of the TOCM E7.

In the example embodiment, the system also includes a traditional tuner module F7 for receiving (and/or sending) data, content (programs), analog or digital television, etc.

A network storage system G7 may also be included in the system, e.g., a VOD (or SVOD) server system such as the Concurrent Computer Corp. "Media Hawk" VOD server. The network storage system G7 may store both content (essence (e.g., audio/video) and metadata), previews, and other content.

Function H7, that occurs within the S-A Explorer 8000 Set Top Box A7, accommodates the storage, recording, playback of content (metadata and essence), table of content information, and is able to capture and playback preview content. The system may also include an MPEG decoder 17 within the S-A STB A7 that processes and provides full-motion full or partial screen video (and audio).

A software module called "External Bandwidth Manager" J7 performs the following: a) tuning channels to obtain content currently on-air, b) making requests to S-VOD or VOD servers; c) making requests for purchase and/or download of content not available. Requests for content may also be for purchase of physical media.

Figure 8:
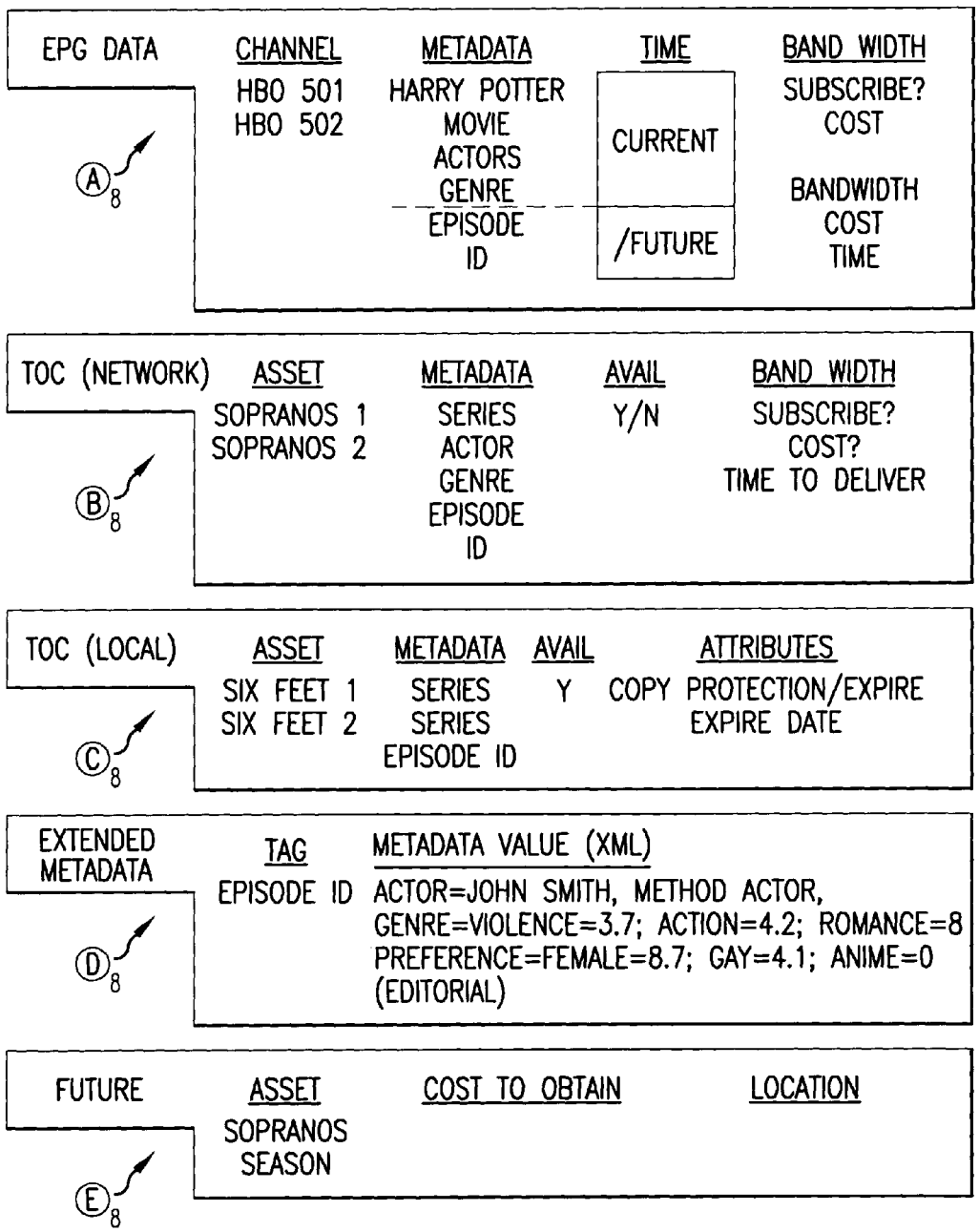
FIG. 8 illustrates data types used by the system illustrated in FIG. 7.

FIG. 8 illustrates data types and metadata elements (or fields) used by the system illustrated in FIG. 7. These metadata elements describe the content (e.g. actors, genre) and add a "weighting factor" to link the traditional metadata field with a weight of how germane that metadata field is to the content (program). For example, in D8, a metadata field (or category) "Gay" (representing a storyline about Gay/Lesbian themes) also may contain a "weight" or value (shown here as 4.1), which would indicate (on a scale of 1 to 10) that the storyline is "less than half" themed on Gay topics. The weight of 8.7 associated with "Female" might be so strong as to indicate a storyline about feminist issues. In the "actor" metadata category, for example, an extreme "10" value might imply a one-person-show, while a "1.0" value might be a cameo or other type of guest appearance by the particular actor. The weighting system that may be associated with metadata fields is subjectively applied by the content provider and values need only be consistent among other content and among similar metadata fields that are used in the preference engine (described in further detail below) and/or sort order display modules.

Using the weighting, a programming provider may be able to "punch through" various filters in order to more heavily favor the display of titles of those programs that are higher priorities to the programming provider (e.g., for promotional, marketing, or any other reason). In one embodiment, a programming provider may purposely weight (e.g., somewhat misdescriptively) a metadata field with a value that is higher than the content would otherwise be entitled in order to, for example, override or supercede user preference filters and/or other filters in the system. For example, if the programming provider believes that the program is of particularly excellent quality, but is only slightly related to feminist issues, the content provider may assign a weight of "10.0" to "Female,"

particularly if the provider believes that the content or program may be of particular interest to users who are interested in feminist issues (even though the content, itself, is only slightly related to feminist issues). In another embodiment, the programming provider may assign a weighting of "10.0" to all fields, so that the title of the program appears on all lists (no matter what filter is set). In another embodiment, an additional field may be included that expressly sets the content/service providers priorities. For example, such a field may be assigned a weighting of "10.0" if the programming provider wants the title of the program listed no matter what the user profile looks like. A weighting of "5.0" may indicate that the title of the program should be listed if the user profile indicates that the user is at least marginally interested in programs of a particular type.

In FIG. 8, data may be in Extensible Markup Language (XML) format or other data formats that permit sorting, parsing, and categorization. In the example embodiment of the present invention, the following may be data types used in the system: conventional EPG data A8 such as that currently provided by Tribune Media Services as a part of their real-time data service, Table of Contents (TOC) data B8 that is provided via the Broadcast File System (BFS) in the normal management of the S-A Explorer digital STB system, S-VOD systems such as Concurrent MediaHawk, TOC data C8 provided internally to the S-A Explorer 8000 PVR system, extended metadata D8 such as that supplied by a programming provider either via a web site or enhanced fields to currently-deployed metadata and asset systems such as the CableLabs VOD-1.0 metadata and on-demand content specifications, and another data type E8 for future content including externally-available content such as a download request asset identifier (for example, for a consumer to request either a download of an entire season of a program or the request could be a descriptor for a commerce transaction for the consumer to order a physical copy of the content via external fulfillment).

Table of Contents Manager Module

Figure 9:
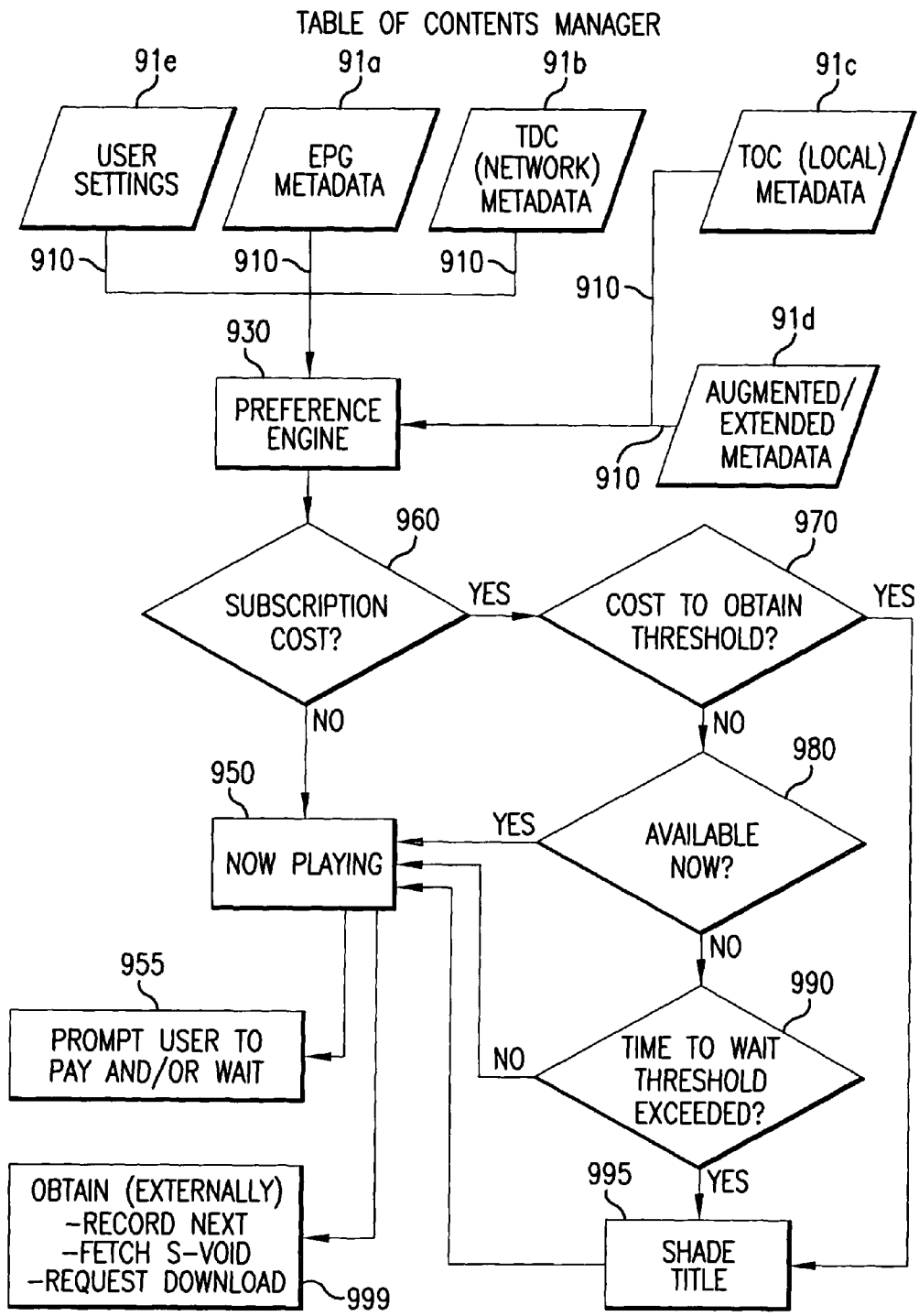
FIG. 9 illustrates an example method implemented by the Table of Contents Manager of FIG. 7.

FIG. 9 illustrates an example method implemented by the Table of Contents Manager (TOCM) module (e.g., E7 of FIG. 7) in order to populate, e.g., the "Now Playing" area H2 of FIG. 2. A similar method may be used to populate list area F2 of FIG. 2, although with different priorities and possibly different or additional considerations.

In step 910, input data regarding programming (e.g., EPG data 91a, Table of Contents data 91b from a network, Table of Contents data 91c stored locally (on PVR), Augment/Extended Metadata 91d, and/or User Settings 91e) is provided to a Preference Engine. The input data regarding programming 91a, 91b, 91c, 91d, 91e may include metadata associated with programming that is immediately available or will be available in the future metadata associated with programming that is available via download or datastreaming, on-air metadata, and future metadata.

In step 930, the Preference Engine parses the input data to determine its relevance in light of the user preferences and then sorts the input data in terms of the particular content of the programming and metadata weights of relevance. The Preference Engine sorts the input data to determine a list of programming titles for Now Playing List H2. The TOCM module generates an ordered-list of content that is the calculative outcome of relevance to the user based on the result of the preference engine's analysis in step 930. The preference engine in step 930 determines the user's desire for a particular piece of content by analyzing user preferences, metadata values and the content's availability to the user (e.g., currently on-air, currently on-disk, available by free request, available by low-cost, fast, download, or available by necessary subscription or cost).

In step 960, a determination is made as to whether the content is available to the user, but with further cost to the user (e.g., available via a subscription or a one-time fee). If the content is freely available (e.g., no further cost and immediately available) to the user, the TOCM Module proceeds to step 950 where the Now Playing list H2 is displayed to the user: If the content is not freely available to the user, a determination is made in step 970 as to whether the cost is below the user's "Cost to Obtain" threshold parameter. If not, the title of the content may be shaded in step 995 and the TOCM module proceeds to step 950 where the shaded title is added to the Now Playing list H2 for display to the user. If the cost is below the "Cost to Obtain" parameter threshold, a determination is made in step 980 as to whether the content (programming) is available now to the user. If so, the title is added to the Now Playing list H2 for display to the user in step 950. If the content is not available to the user in step 980, the TOCM module proceeds to step 990 and determination is made as to whether the content will be available within a time below the user's "Time to Wait" threshold. If not, the title of the programming is shaded in step 995, and the shaded title is added to the Now Playing list H2 for display to the user in step 950. If the programming is available at a time below the "Time to Wait" parameter, the TOCM module proceeds to step 950 where the title is added to the Now Playing list H2 for display to the user. In the example embodiment of the present invention, a shaded title would indicate to the user that although the programming associated with the title may be of interest to the user, it is only available for further cost and/or a longing waiting time than the user's threshold settings.

In step 999, external content acquisition is performed based on a user request. The user may request to view programming listed in the Now Playing list H2 that is displayed in step 950. The system of the present invention acquires the programming via tuning the user's set-top box to the appropriate channel airing the desired programming. Also, the system of the present invention acquires the programming by performing the external content acquisition in step 999 such that the desired programming is obtained via S-VOD, VOD, a download service, a media streaming mechanism, or by recording the next airing of the program onto a PVR. If a user selects a shaded title, the user may receive further information regarding the additional cost of the programming and/or the amount of time the user will have to wait for the programming. The user may also be prompted to pay for the content (or subscribe) and/or to wait in step 955.

Profile Manager Module and Suggestion Manager Module

Figure 10:
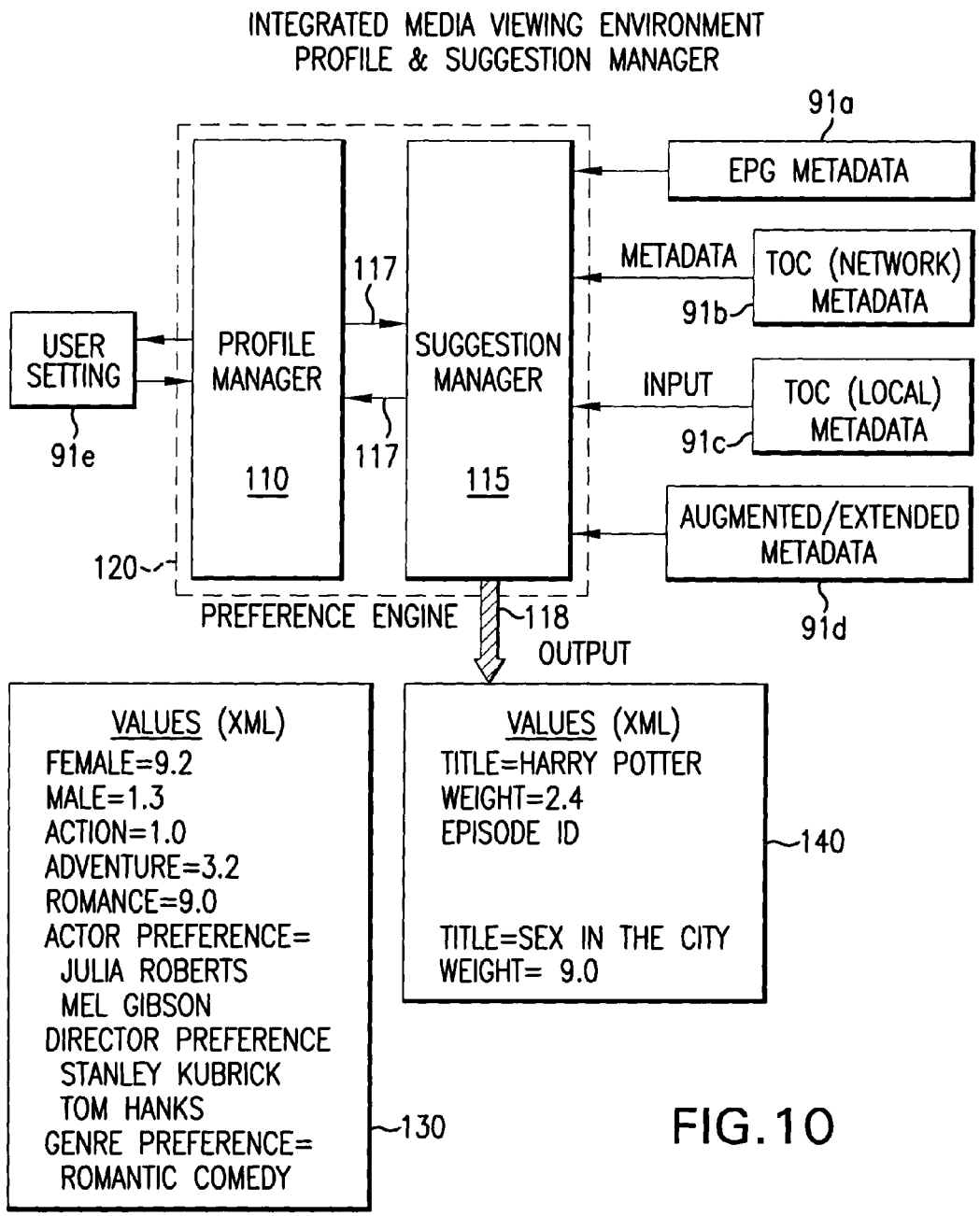
FIG. 10 illustrates an example Profile Manager module and Suggestion Manager module.

FIG. 10 illustrates the Profile Manager module 110 (e.g., D7 of FIG. 7) and the Suggestion Manager module 115 (e.g., C7 of FIG. 7). The combination and interaction 117 of the Profile Manager Module 110 and the Suggestion Manager module 115 form the "Preference Engine" 120.

The Profile Manager module 110 determines what the user "wants," by managing a User Profile 130 and conveying an indication of what the user "wants" to the Suggestion Manager 115. The User Profile may include preference values set by the user via a User Settings module 91e, and/or preference values set or determined by the Profile Manager module 110 based on (e.g., implied by) observed actions of the user (e.g., based on the viewing history of the user). In the example embodiment of the present invention, the preference values may be represented in the User Profile 130 in the XML format as weightings, values or descriptions for various categories such as actor preferences, director preferences, genre preferences.

In this embodiment, the User Settings module 91e (e.g., weightings or values for categories such as actor preference, director preferences, genre preferences, etc.) may allow a user to expressly convey or set his or her preferences using, for example, dialog boxes/UI elements which may include "fill-in-the-blank" form-type data entry, interactive "Wizard" type guided/interview questions, or values set by setting a "slider". Some preferences may be implied by other set values (e.g., high levels for several male actors might set or modify an internal setting for the preference value "male"), or derived based on the viewing history of the user.

The User Profile 130 may also indicate what programming is available to the user. For example, the User Profile 130 may include information regarding an identification of the particular cable or satellite service to which the user subscribes, information as to whether or not the user's STB is configured to access the Internet for downloading and/or datastream programming, information as to whether or not the user's STB can accept removable media such as an optical disc or magnetic media), etc. Such information could be set by the user (e.g., via the User Settings module 91e), or determined by the Profile Manager 110.

The User Profile 130 may be updated from time to time (occasionally, periodically, etc.). For example, if a new preference value (e.g., a new category) is to be set, the Profile Manager 110 may prompt the user to input preference information. The Profile Manager may also adjust values, for example, as the system configuration and/or implied user preferences, etc., change.

The Suggestion Manager 115 receives user profile information (e.g., the User Profile or information derived therefrom) from the Profile Manager module 110. Based on this information, metadata values (described above) associated with available programming or content, and/or priorities of the service provider, the Suggestion Manager module 115 determines what programming should be listed (e.g., suggested) for the user, e.g., in the "Now Playing" list H2 of FIG. 2, including, for example, the order of the titles. In the example embodiment, the listed programming includes content that is available to the user and that fits or corresponds to the user profile information and/or is to be "punched-through" (e.g., content that does not fit the user information but meets some other priority of the programming provider).

In some cases, the Suggestion Manager 115 may not be able to determine what content fits either the user profile and/or what content is to be "punched-through" based on a metadata value. As a result, the Suggestion Manager 115 may interact 117 with the Profile Manager 110 in order to have the Profile Manager 110 re-determine the weightings (e.g., scale weights) and/or values for the user settings and for the implicitly-observed descriptions based on actions of the user stored in the User Profile 130.

FIG. 10 shows an example output 140 of the Suggestion Manager 115. This output may include titles and metadata values associated with suggested programming, and an indication of what order the titles should be displayed. This output 140 may be further processed, for example, as described above in connection with FIG. 9.

Preview Capture

FIG. 11 illustrates a "preview capture" method according to an example embodiment of the present invention. The "preview capture" method may allow either the local PVR or network PVR to capture content "on-the-fly" to augment previews that are specifically sent (e.g., "pitched" in a conventional VOD or SVOD system from a central facility via satellite such that the user is able to select and view a preview that is predefined and available for viewing). In terms of the "preview capture" method, raw incoming content A11 includes essence (video and/or video signals) and metadata. The raw incoming content A11 may be programming that is currently airing, the user may not be viewing that programming. A 'capture gate' module B11 starts and stops the recording process on either the local PVR or network PVR via flags sent in advance from a central facility. Frame accurate recording mechanisms may be determined from Society of Motion Picture and Television Engineers (SMPTE) time code or internal MPEG clocking mechanisms. A storage mechanism C11 (either the STB PVR or network storage) may used by the "preview capture" method. A preview asset D11 is feed through a Preview Hierarchy. A 'hierarchy' E11 of how generic vs. specific previews are stored efficiently in the storage system is used by the "preview capture" method. For example, in the absence of preview content, all requests for previews would be fulfilled by a generic promotion for the programming provider. Once specific content is obtained (captured or transmitted), it may be provided by specific hierarchy. A programming series "generic" preview may be supplied unless a preview was provided for a specific episode. For example, a generic preview for the Sopranos TV series may include highlights from various episodes and a specific preview for The Sopranos TV series would only include highlights from one particular Sopranos episode. In another embodiment, previews are simply provided by a content provider, together with or separately from the content. Also in another embodiment, a broadcast channel may be used to broadcast previews at a certain time period. The "preview capture" method may allow the local PVR or network PVR to be programmed to record the preview at the certain time period.

Alternative Embodiments

Figure 12:
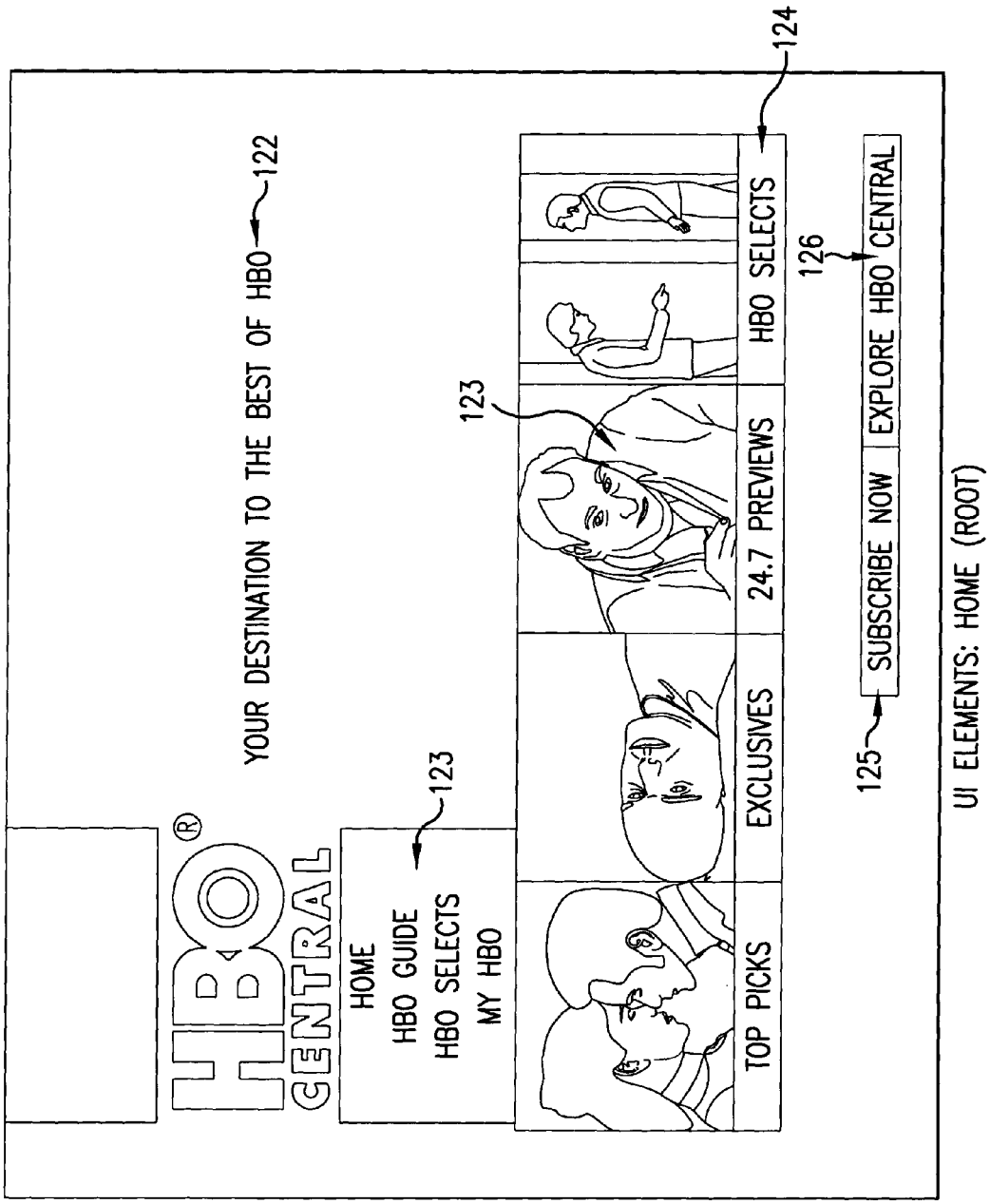
FIG. 12 illustrates an alternative embodiment of the integrated media viewing environment illustrated in FIG. 1.

FIG. 12 illustrates an alternative embodiment of the integrated media viewing environment illustrated in FIG. 1. FIG. 12 illustrates a "home page" of the integrated media viewing environment. The integrated media viewing environment may be displayed on a television (TV) (via; for example, a set-top box), a personal computer, or on any device that has the ability to play media content by manner of user selection.

The User Interface (UI) illustrated in FIG. 12 may include an area for optionally branding the UI by logo of either a service provider (e.g., a fee-based provider of a PVR, content management, etc.) or a content provider (e.g. HBO) 121. The UI may also include an area reserved for marketing slogans, advertising or other information 122.

Also, a highlight area 123 may be provided for moving and/or still graphic images that may represent, for example, other pages or areas within the integrated environment. Textual descriptions 124 of the items in the highlight area 123 may be provided below the images. In the example embodiment, the user may navigate over and select (via, e.g., a remote control device, keyboard, mouse, etc.) a textual description so that the user may be directed to an associated page or area within the environment. As shown in FIG. 12, for example, the textual descriptions 124 include "Top Picks," "Exclusives," "24.7 Previews" and "HBO Selects" images. In the example embodiment, each of these areas may be navigated over and selected by a user. The user is then directed to a new page or area, depending on which description is selected. For example, if "Top Picks" is selected, the user is directed to the "Top Picks" page or area. Horizontal scrolling may also be supported within the highlight area 123 and the textual descriptions 124.

Optional selections 125, 126 may be displayed by the integrated media viewing environment content when a user is not currently a subscriber to the UI service (and/or content of the programming provider) or when the users desires to "explore" content (i.e., preview content) without being prompted for subscription.

Figure 17:
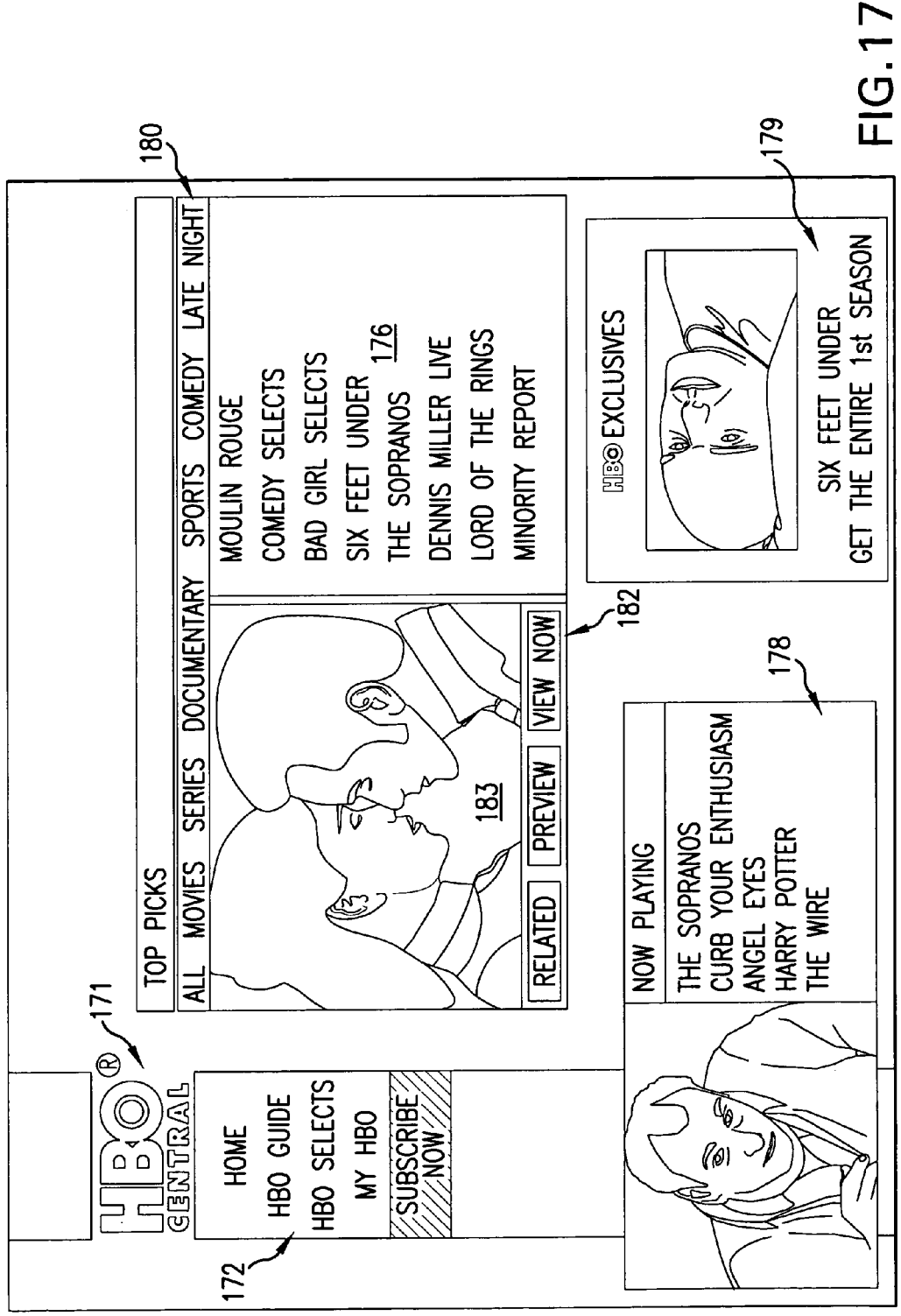
FIG. 17 illustrates an alternative embodiment of the integrated media viewing environment illustrated in FIG. 2.

FIG. 17 illustrates an alternative embodiment of the integrated media viewing environment illustrated in FIG. 2. FIG. 17 illustrates an integrated programming guide page, e.g., a "Top Picks" page, according to an example embodiment of the present invention. In this example embodiment, the "Top Picks" page includes a "branding area" 171 to display, for example, information related to the service provided. Also included is a navigation menu 172 of "areas" in the UI such as "home" (e.g., which, when selected, brings the user to the Home Page), "Guide" (e.g., which, when selected, displays a list of available content), "Selects" (which, when selected, displays a list of featured content), and "My HBO" (e.g., suggestions/favorites bookmarked). Also displayed in this menu 172 is a selectable button for "Subscribe Now". In this example embodiment, the "Subscribe Now" button appears only if the user has the ability to subscribe to content or needs to pay for content that is above a configurable threshold of cost.

In one area of the "Top Picks" page, a "list area" 176 provides a list of content programming that may be, for example, highly suggested by a service provider (e.g., a filtered list of titles of programs). A navigation bar 180 is available which provides filter parameters for the "list area" 176. Filter parameters may include "All", "Movies", "Series", "Documentary", "Sports", "Comedy" and "Late Night". Selecting a filter parameter in the navigation bar 180 may provide further filtering for the list of titles. An icon, e.g., icon 181 in FIG. 13, may optionally be provided next to some or all of the program titles. In one example embodiment, the icon 181 may provide the user with visual cues as to whether the program associated with the title is stored locally (e.g., on the PVR) or currently airing (i.e., "now showing"). The icon 181 may also indicate that the program is highly-rated or suggested, or of specific interest. A user may navigate over a title and select it (using, for example, a remote control device, a keyboard, a mouse, etc.).

The "Top Picks" page illustrated in FIG. 17 also includes a navigation area 182 that may be configured, for example, based on the content capability, availability and/or user ability. In the example embodiment of FIG. 17, the navigation area 182 may display the options of "related," "preview" and "view now." When the "related" option is selected, a user may display information related to the selected title. For example, a drop-down menu may appear that lists various options including, e.g., "by actor," "by director" and "by genre." The user would then select one of the options and obtain, for example, titles of programs that are available for viewing (now or in the future) in which the same actors appears are displayed. By selecting "by director," titles of programs that are available for viewing (now or in the future) which are directed by the same director is provided. Finally, by selecting "by genre," titles of programs of the same genre as the selected title is displayed.

The "preview" option appears when a preview is available for the selected program title. When selected, the preview may be, for example, a full motion video clip and/or an audio clip. The preview may be stored on the user's PVR or hard disk, or may be available in real-time from a service provider (e.g., via satellite, cable, broadcast, etc.). As discussed above, the preview may also be captured "on the fly".

The "view now" option does not appear to a user who is not a subscriber to the source of the program title or if the cost threshold exceeds the user-set limit and has not chosen to otherwise subscribe. When the "view now" option is selected, the program associated with the selected title plays.

FIG. 17 includes a "Viewing" area 183. In the example embodiment, the "Viewing" area 183 displays previews, data, images, video and other media related to a program that the user has selected.

FIG. 17 also shows a "Now Playing" area 178. In the example embodiment, the "Now Playing" area 178 displays a list of titles of programs that are available for immediate viewing. For example, the list may include titles of programs that are stored locally on the user's PVR or hard drive. The list may also include titles of programs that are currently airing on television, or that are available on an "on-demand" basis. In accordance with the example embodiment of the present invention, the list may be filtered so that only certain program titles appear, e.g., the titles of programs on certain channels, titles of programs with different themes and genres, or user defined criteria. In this example embodiment, if a user selects a title on the list, the program will begin to play. In particular, if the program is stored on the user's PVR, the program will play from the user's PVR; if the program is currently airing on television, the television or tuner will be tuned to the proper station; if the program is currently available via network storage (e.g., S-VOD) the program will play following a request to the network to obtain the program; if the program is currently available via download or data streaming, the program will play (and/or be download to local storage) following a request to the network.

The "Top Picks" area may also include another display or navigation area 179 (which may include support for full-motion content) that may include a banner ad or link to specific content (e.g., a program) or feature.

FIG. 13 illustrates an alternative embodiment of the integrated media viewing environment illustrated in FIG. 3. Highlighting 130 of a particular title of list 176 in FIG. 17 is illustrated in FIG. 13. Icons 181 are also illustrated that indicate the availability of a listed program.

Figure 14:
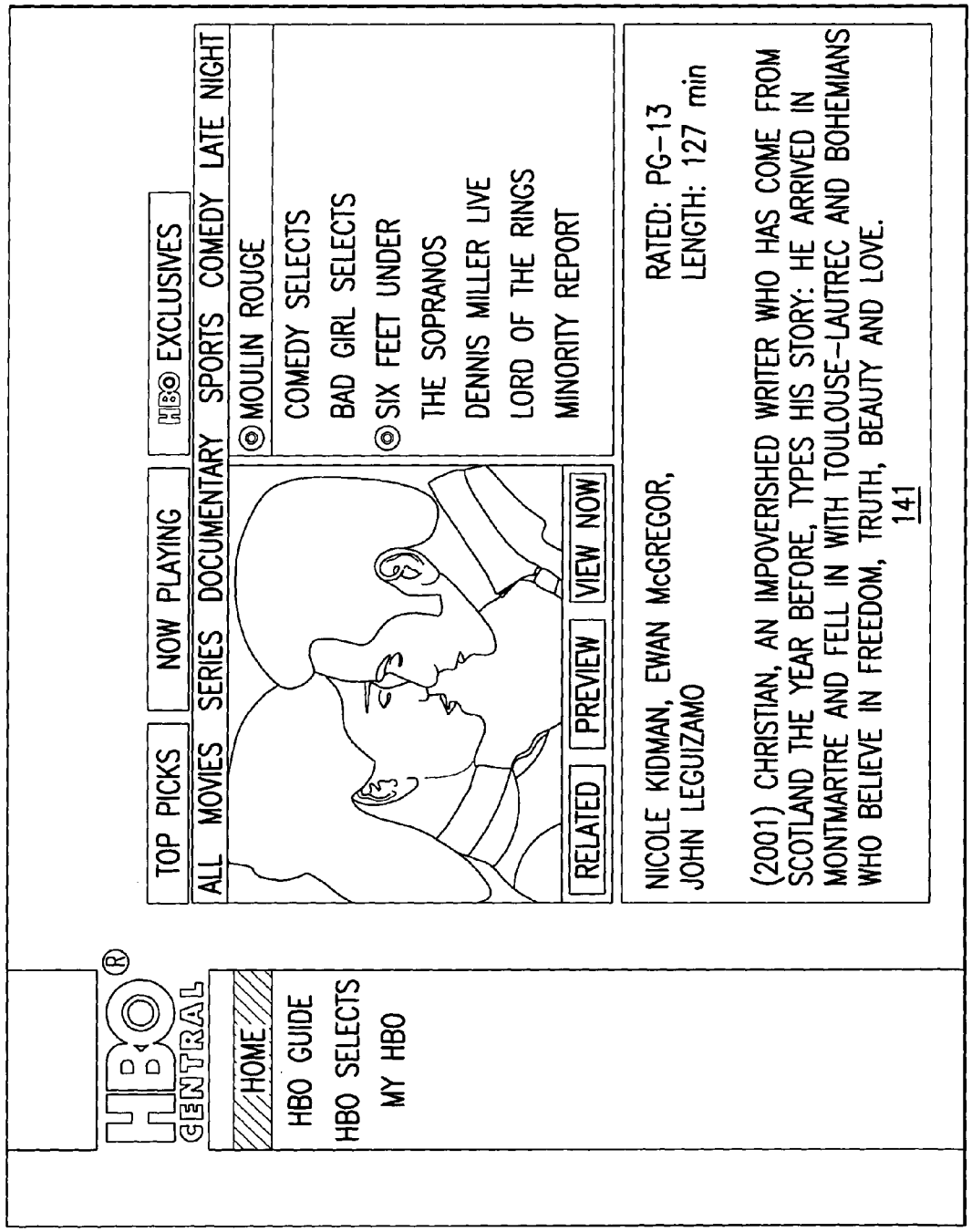
FIG. 14 illustrates an alternative embodiment of the integrated media viewing environment illustrated in FIG. 4.

FIG. 14 illustrates an alternative embodiment of the integrated media viewing environment illustrated in FIG. 4. FIG. 14 illustrates the integrated media viewing environment illustrated in FIG. 13 after a particular title is selected. After highlighting a particular title of the list F2 of FIGS. 2 and 3 or the list 176 of FIG. 17, a display area 141 may appear, e.g., replacing the "Now Playing" H2, 178 and navigation area 12, 179. The display area 141 may display metadata, in textual form, associated with the selected title. In the example embodiment, the metadata may include, for example, a brief description of the program associated with the selected title, ratings information (e.g., PG-13), length of the program, identification of actors, directors, genre, etc.

Figure 15:
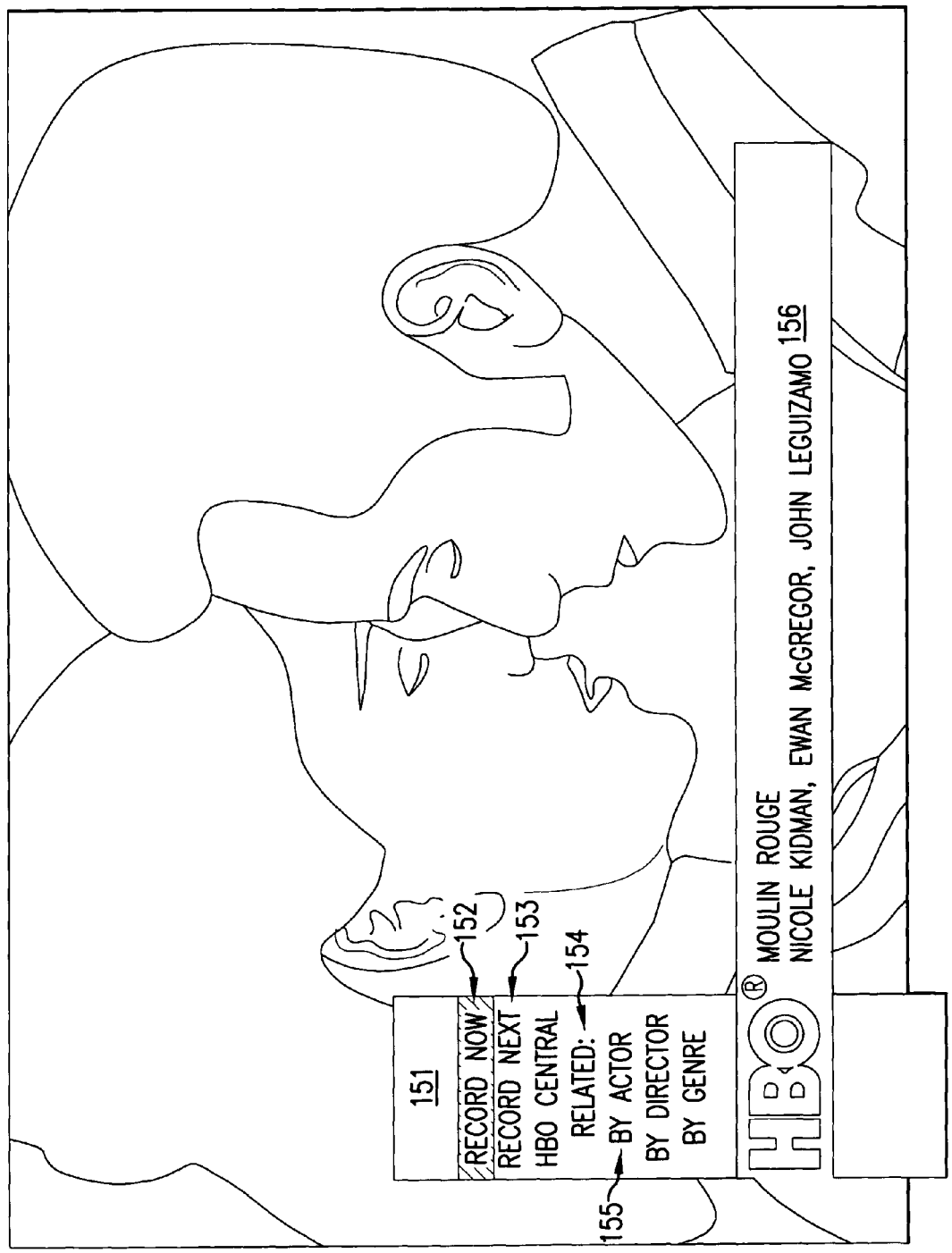
FIG. 15 illustrates an alternative embodiment of the integrated media viewing environment illustrated in FIG. 5.

FIG. 15 illustrates an alternative embodiment of the integrated media viewing environment illustrated in FIG. 5. The view of the integrated media viewing environment in FIG. 15 may be displayed to a user while the user is viewing media content (e.g., a program). The view may be a UI mode that provides additional elements for use while the user is viewing content (for example, either preview, "full-screen" viewing within the integrated media viewing environment or as an overlay of the users TV screen,) accessed by pressing a remote control button (such as "info"). The UI mode illustrated in FIG. 15 may include a navigation element 151 that allows the user to either record the current program (if, for example, the consumer is watching a traditional cable or broadcast program that was selected by a traditional means such as using an EPG or via "channel surfing") or to record the current program during a future showing. In the example embodiment, the "Record Now" option 152 of the navigation element 151 would actuate a PVR function (for example, within a set-top box, home media server, or a Network-based PVR system) to begin recording from this point.

The "Record Next" option 153 would cause, for example, a Table Of Contents Engine (described in further detail below) to search all content available (channels, S-VOD, VOD, download) to obtain (e.g., by scheduling a download or scheduling recording of an airing) the next full showing of the desired content.

Figure 16:
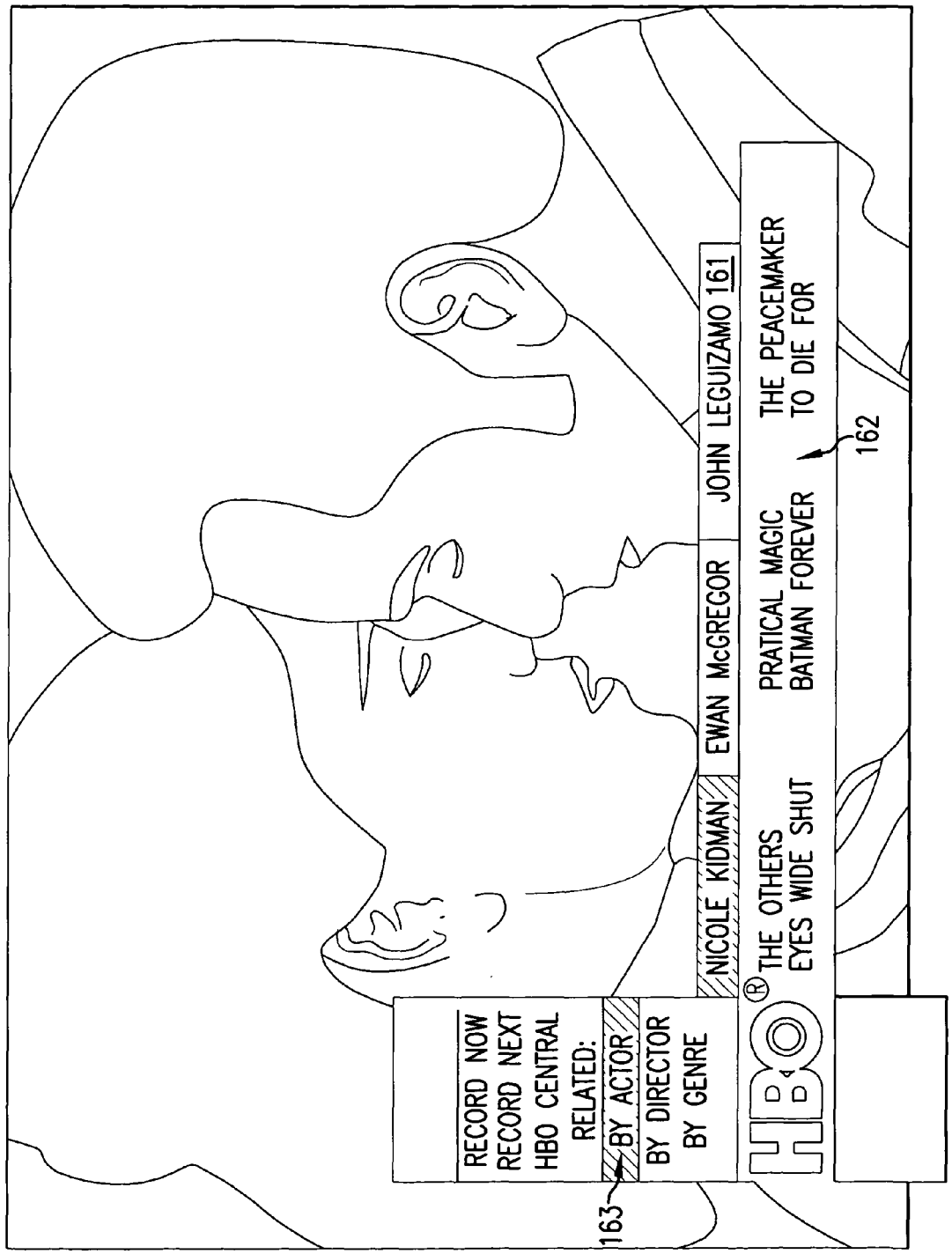
FIG. 16 illustrates an alternative embodiment of the integrated media viewing environment illustrated in FIG. 6.

Also, a navigation bar 154 may provide metadata related to the content currently on the screen. This may be implemented in a manner similar to the "related" option described above in connection with the "Top Picks" page of FIG. 2 or FIG. 17. For example, selecting "related, by actor" 155 in the navigation bar 154 may cause metadata display area 156 (see C5 in FIG. 5) to list other program or content (available or otherwise) featuring the same actor now appearing (in the content as a whole or in this particular scene). Other FIG. 16 illustrates an alternative embodiment of the integrated media viewing environment illustrated in FIG. 6. FIG. 16 illustrates another view of the integrated media viewing environment according to the present invention, that is displayed to a user for input user preferences. This view may be a UI mode for finding other content or programs (available or otherwise) that the viewer may desire information regarding. For example, this view may be available after selecting or navigating over "related, by actor" 155 in navigation bar B5, 154 of FIG. 5 or FIG. 15.

As shown, in the view illustrated in FIG. 16, multiple actors may be displayed in a navigation element 161. A particular actor may then be selected, and titles of content or programs in which the selected actor also appears may be displayed in list box 162.

Selections in the navigation bar 163 may be augmented by, for example, a preference engine and may include selections "by actor" (tagged by metadata described herein); "by genre" (also from metadata) "by suggestion" (a broader metadata match including editorial suggestions and more direct weighting by the preference engine or user preferences than actor, genre, etc.).

Modifications

In the preceding specification, the present invention has been described with reference to specific example embodiments thereof. It will, however, be evident that various modifications and changes may be made thereunto without departing from the broader spirit and scope of the present invention. The description and drawings are accordingly to be regarded in an illustrative rather than restrictive sense.

What is claimed is:

1. A method for displaying a media guide to a user, comprising:
   receiving information regarding media programs which include: i) programs that are immediately available to the user via download or data streaming; ii) programs that have been previously stored, by a set-top box after receipt by the set-top box from an external transmission source, locally relative to the user on a local recording device; and iii) programs that are immediately available to the user via television broadcast, the information including titles of the media programs;
   filtering, by applying a same criterion, each of the i) programs that are immediately available to the user via download or data streaming, ii) programs that have been previously stored locally relative to the user, and iii) programs that are immediately available to the user via television broadcast for obtaining a set of recommended titles, wherein the filtering of the programs that have been previously stored locally includes searching the local recording device for stored programs satisfying the criterion; and
   displaying the set of recommended titles in a single integrated list, the set of recommended titles including a title of at least one of the programs immediately available to the user via download or data streaming, a title of at least one of the programs that have been previously stored locally relative to the user, and a title of at least one of the programs that are immediately available to the user via television broadcast.

2. The method according to claim 1, wherein the locally stored media programs include programs that are stored on a personal video recorder.

3. The method according to claim 1, wherein available to the user via television broadcast include programs that are available to the user via at least one of: i) satellite broadcast, and ii) cable broadcast.

4. The method according to claim 1, wherein the information includes data which describes content of the media programs, and wherein the method further comprises:
   comparing the data that describes the content of the media programs to data that describes user preferences, wherein the displaying step includes displaying the titles based on a result of the comparison.

5. The method according to claim 1, further comprising:
   in response to the user selecting one of the titles of the media programs, displaying a preview of a media program associated with the selected title.

6. The method according to claim 1, wherein the media programs further include media programs that are available to the user in the future.

7. The method according to claim 1, wherein the titles are displayed with a graphical indication of availability of the media programs.

8. The method according to claim 1, further comprising:
   in response to the user selecting one of the titles of the media programs, recording a television broadcast.

9. The method according to claim 1, further comprising:
   in response to the user selecting one of the titles of the media programs, providing a media program via one of download and data streaming.

10. The method according to claim 1, further comprising:
    in response to the user selecting one of the titles of the media programs, displaying information related to the selected media program, the information includes at least one of actor data, director data and genre data.

11. The method according to claim 1, further comprising:
    prompting the user to at least one of pay a cost and wait a time period before viewing a media program.

12. The method according to claim 1, wherein all of the programs whose titles are included in the single integrated list of recommended titles are selected for inclusion of their titles in the single integrated list in accordance with at least one of promotional priorities, user program preferences, and user program experience history.

13. The method according to claim 4, further comprising:
    receiving the user preferences expressly from the user.

14. The method according to claim 13, further comprising:
    determining the user preferences based on a viewing history of the user.

15. The method according to claim 13, wherein the displaying step includes displaying titles of media programs that do not meet the user preferences and that meet a promotional priority of a service provider.

16. The method according to claim 5, further comprising: generating the preview based on flags transmitted from a central facility.

17. The method according to claim 5, further comprising: receiving the preview with the media program associated with the selected title.

18. The method according to claim 7, wherein the graphical indication includes at least one of color shading and an icon.

19. The method according to claim 7, wherein the media programs include media programs that are available to the user in the future and programs that are stored locally, and wherein the graphical indication describes whether the media programs are one of immediately available for download or data streaming, immediately available via television broadcast, stored locally, and available in the future.

20. A method of displaying a program guide to a user, comprising:
a) receiving information from a programming provider that indicates suggested media programs;
b) receiving express user preferences from the user;
c) displaying, on a single page and in a first list, titles of at least some of the suggested media programs;
d) displaying, on the single page in a second list, titles of at least some media programs that are immediately available to the user and that meet at least one of the user preferences, a separation of the first and second lists being demarcated;
e) displaying a single filter bar including a plurality of filter-specification buttons, wherein, for each of the buttons, selection of the button causes a respective type of filtering of both of the first and second lists; and
f) displaying, on the single page and in the second list, titles of media programs that do not meet the user preferences and that meet a promotional priority of a service provider.

21. The method according to claim 20, further comprising: receiving metadata associated with at least some media programs, the metadata including information that describes the media programs, wherein step d) includes comparing the metadata to the express user preferences, and displaying titles of media programs based on the comparison.

22. A system, comprising:
a processor;
at least one arrangement configured to communicate with the processor via a communications network;
a computer-readable storing medium storing a set of instructions, the set of instructions capable of being executed by the processor to implement a method for displaying a media guide to a user, the set of instructions performing the steps of:
receiving information regarding media programs which include: i) programs that are immediately available to the user via download or data streaming; ii) programs that have been previously stored, by a set-top box after receipt by the set-top box from an external broadcasting source, locally relative to the user on a local recording device; and iii) programs that are immediately available to the user via television broadcast, the information including titles of the media programs;
filtering, by applying a same criterion, each of the i) programs that are immediately available to the user via download or data streaming, ii) programs that have been previously stored locally relative to the user, and iii) programs that are immediately available to the user via television broadcast for obtaining a set of recommended titles, wherein the filtering of the programs that have been previously stored locally includes searching the local recording device for stored programs satisfying the criterion; and
displaying the set of recommended titles in a single integrated list, the set of recommended titles including a title of at least one of the programs immediately available to the user via download or data streaming, a title of at least one of the programs that have been previously stored locally relative to the user, and a title of at least one of the programs that are immediately available to the user via television broadcast.

23. The system according to claim 22, wherein the information includes data which describes content of the media programs, and wherein the method further comprises:
comparing the data that describes the content of the media programs to data that describes user preferences, wherein the displaying step includes displaying the titles based on a result of the comparison.

24. The system according to claim 22, wherein the method further comprises:
in response to the user selecting one of the titles of the media programs, displaying a preview of a media program associated with the selected title.

25. The system according to claim 22, wherein the titles are displayed with a graphical indication of availability of the media programs.

26. The system according to claim 22, wherein the method further comprises:
in response to the user selecting one of the titles of the media programs, providing a media program via one of download and data streaming.

27. The system according to claim 22, wherein all of the programs whose titles are included in the single integrated list of recommended titles are selected for inclusion of their titles in the single integrated list in accordance with at least one of promotional priorities, user program preferences, and user program experience history.

28. A system, comprising:
a processor;
at least one arrangement configured to communicate with the processor via a communications network;
a computer-readable storing medium storing a set of instructions, the set of instructions capable of being executed by the processor to implement a method for displaying a program guide to a user, the set of instructions performing the steps of:
a) receiving information from a programming provider that indicates suggested media programs;
b) receiving express user preferences from the user;
c) displaying, on a single page and in a first list, titles of at least some of the suggested media programs;
d) displaying, on the single page in a second list, titles of at least some media programs that are immediately available to the user and that meet at least one of the user preferences, a separation of the first and second lists being demarcated;
e) displaying a single filter bar including a plurality of filter-specification buttons;
f) displaying, on the single page and in the second list, titles of media programs that do not meet the user preferences and that meet a promotional priority of a service provider; and g) for each of the buttons, applying a respective filter to both of the first and second lists in response to selection of the button.

29. The system according to claim 28, wherein the method further comprises:
receiving metadata associated with at least some media programs, the metadata including information that describes the media programs, wherein step d) includes comparing the metadata to the express user preferences, and displaying titles of media programs based on the comparison.

30. A method for displaying a media guide to a user, comprising:
in accordance with user input:
receiving media programs via at least one receiving device from an external transmission source; and
storing, by the receiving device and locally relative to the user on a recordation device, the received media programs;
subsequent to the storing, receiving information regarding media programs which include: i) programs that are immediately available to the user via at least one of download, data streaming, and television broadcast to the at least one receiving device; and ii) the programs that have been previously stored locally on the recordation device; and
subsequent to, and in accordance with, the receiving information step:
filtering, by applying a same criterion, i) the programs that are immediately available to the user via at least one of download, data streaming, and television broadcast to the at least one receiving device, and ii) the programs that have been previously stored locally on the recordation device for obtaining a set of recommended titles, wherein the filtering of the programs that have been previously stored locally includes searching the local recordation device for stored programs satisfying the criterion; and
displaying the set of recommended titles in a single integrated list, the set of recommended titles including a respective title of each of at least one of the programs that are immediately available to the user via at least one of download, data streaming, and television broadcast, and a respective title of each of at least one of the programs that have been previously stored locally on the recordation device, wherein the displaying includes displaying each of the respective titles of the at least one of the programs that have been previously stored with a respective icon indicating that the program has been locally recorded.

* * * * *